United States Patent
Kunitomo et al.

(10) Patent No.: US 10,732,918 B2
(45) Date of Patent: Aug. 4, 2020

(54) DISPLAY SYSTEM, METHOD OF CONTROLLING DISPLAY SYSTEM, AND DISPLAY DEVICE

(71) Applicant: SEIKO EPSON CORPORATION, Tokyo (JP)

(72) Inventors: Yuichi Kunitomo, Matsumoto (JP); Kazuma Kitadani, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/229,662

(22) Filed: Dec. 21, 2018

(65) Prior Publication Data
US 2019/0196771 A1 Jun. 27, 2019

(30) Foreign Application Priority Data
Dec. 22, 2017 (JP) .................. 2017-246846

(51) Int. Cl.
| | | |
|---|---|---|
| G09G 5/00 | (2006.01) | |
| G09G 5/10 | (2006.01) | |
| G09G 5/37 | (2006.01) | |
| G02B 27/01 | (2006.01) | |
| G06F 3/14 | (2006.01) | |

(52) U.S. Cl.
CPC ......... *G06F 3/1423* (2013.01); *G02B 27/017* (2013.01); *G02B 27/0172* (2013.01); *G09G 5/003* (2013.01); *G09G 5/10* (2013.01); *G09G 5/37* (2013.01); *G02B 2027/014* (2013.01); *G02B 2027/0118* (2013.01); *G02B 2027/0134* (2013.01); *G02B 2027/0138* (2013.01); *G02B 2027/0178* (2013.01); *G02B 2027/0187* (2013.01); *G09G 2320/0626* (2013.01); *G09G 2340/045* (2013.01); *G09G 2340/0464* (2013.01); *G09G 2340/12* (2013.01)

(58) Field of Classification Search
CPC combination set(s) only.
See application file for complete search history.

(56) References Cited

U.S. PATENT DOCUMENTS

| | | |
|---|---|---|
| 2002/0126066 A1 | 9/2002 | Yasukawa et al. |
| 2012/0242560 A1 | 9/2012 | Nakada et al. |

(Continued)

FOREIGN PATENT DOCUMENTS

| | | |
|---|---|---|
| JP | 2011-059435 A | 3/2011 |
| JP | 2012-204998 A | 10/2012 |

(Continued)

*Primary Examiner* — Wesner Sajous
(74) *Attorney, Agent, or Firm* — Oliff PLC

(57) ABSTRACT

Provided is a display system including a PC and an HMD. The HMD includes an image display unit configured so that an external scenery is visually recognizable, the image display unit being configured to display an image in an overlapping manner with the external scenery and a display control unit configured to cause the image display unit to display an image based on data input from the PC. The display system detects a position of the display unit of the PC with respect to the HMD and adjusts the display in the image display unit when the position of the display unit with respect to the HMD is included in a range of the external scenery visually recognized by the image display unit.

14 Claims, 13 Drawing Sheets

(56) References Cited

U.S. PATENT DOCUMENTS

| | | | |
|---|---|---|---|
| 2012/0306940 A1* | 12/2012 | Machida | G02B 6/005 345/690 |
| 2012/0320100 A1* | 12/2012 | Machida | G02B 27/017 345/690 |
| 2015/0061974 A1 | 3/2015 | Kobayashi | |
| 2015/0084857 A1 | 3/2015 | Kimura | |
| 2015/0279110 A1 | 10/2015 | Kimura et al. | |
| 2017/0160550 A1* | 6/2017 | Kobayashi | H04N 13/344 |
| 2017/0257620 A1* | 9/2017 | Takeda | G09G 5/10 |

FOREIGN PATENT DOCUMENTS

| | | |
|---|---|---|
| JP | 2015-049883 A | 3/2015 |
| JP | 2015-188175 A | 10/2015 |
| JP | 2015-227919 A | 12/2015 |
| WO | 95/005620 A1 | 2/1995 |

* cited by examiner

DISPLAY SYSTEM, METHOD OF CONTROLLING DISPLAY SYSTEM, AND DISPLAY DEVICE

BACKGROUND

1. Technical Field

The present invention relates to a display system, a method of controlling the display system, a display device, and a control method of controlling the display device.

2. Related Art

In the related art, a display device configured to receive and display display images of external devices is known (for example, refer to JP-A-2015-227919). JP-A-2015-227919 describes an example where a Head Mounted Display (HMD) receives and displays, in a display unit, display images transmitted by external devices to integrate display screens of a plurality of devices.

When it is assumed that all the images are displayed by the HMD, the configuration disclosed in JP-A-2015-227919 enables that the display images of external devices are integrated in the HMD display. On the other hand, an example of a technique of controlling a display of a display device in accordance with an external device different from the display device has not been proposed in the related art.

SUMMARY

Some aspects of the invention were contrived in view of the situation mentioned above and an advantage of some aspects of the invention is to control a display by a display device in accordance with an external device.

In order to solve the problem mentioned above, a display system according to an aspect of the invention includes an electronic device including a first display unit and a display device including a second display unit. The display device includes the second display unit configured so that an external scenery is visually recognizable, the second display unit being configured to display an image in an overlapping manner with the external scenery and a display control unit configured to cause the second display unit to display an image based on data input from the electronic device. The display system configured so that a position of the first display unit of the electronic device with respect to the display device is detected and a display in the second display unit is adjusted when the position of the first display unit with respect to the display device is included in a range of the external scenery visually recognized by the second display unit.

According to the aspect of the invention, the display in the second display unit is adjusted to correspond to a positional relationship between the electronic device and the display device, and thus, a display state of the display device can be controlled in accordance with a position of the electronic device being an external device.

Furthermore, according to an aspect of the invention, the second display unit is a transmission-type display unit configured so that the external scenery is visually recognizable by transmitting external light, and at least one of a display position, a display size, and a shape of an image in a display region of the second display unit is adjusted in accordance with the first display unit visually recognized through the second display unit, when the position of the first display unit with respect to the display device is included in the range of the external scenery visually recognized by the second display unit.

According to this configuration, the visibility can be adjusted appropriately when the first display unit is visually recognized through the second display unit.

Furthermore, according to an aspect of the invention, the second display unit is mounted on a head of a user. The second display unit includes a display unit for left-eye configured to emit image light directed at a left eye of the user and a display unit for right-eye configured to emit image light directed at a right eye of the user. A convergence angle of an image displayed in the second display unit is adjusted to correspond to the position of the first display unit, when the first display unit is included in the external scenery visually recognized through the second display unit.

According to this configuration, a distance at which the user visually recognizes the display image of the second display unit can be adjusted corresponding to the position of the first display unit.

Furthermore, according to an aspect of the invention, a convergence angle of an image displayed in the second display unit is set to a predetermined initial state, when the position of the first display unit with respect to the display device is not included in the external scenery visually recognized through the second display unit.

According to this configuration, a display state of the second display unit can be switched appropriately when the first display unit can be visually recognized and when the first display unit cannot be visually recognized through the second display unit.

Furthermore, according to an aspect of the invention, a convergence angle of an image displayed in the second display unit is adjusted by controlling a display position of the display unit for left-eye and the display unit for right-eye.

According to this configuration, the distance at which the user visually recognizes the display image of the second display unit can easily be adjusted by controlling the display position.

Furthermore, according to an aspect of the invention, a focal position of a virtual image in the display unit for left-eye and the display unit for right-eye is adjusted to correspond to the position of the first display unit, when the first display unit is included in the external scenery visually recognized through the second display unit.

According to this configuration, the distance at which the user visually recognizes the display image of the second display unit can be adjusted by adjusting the focal position of the virtual image.

Furthermore, according to an aspect of the invention, the electronic device includes an electronic device control unit configured to set a display of the first display unit to a first display state, when the first display unit is included in the external scenery visually recognized through the second display unit in the display device, and to set a display of the first display unit to a second display state, when the first display unit is not included in the external scenery visually recognized through the second display unit in the display device. The electronic device control unit is configured to execute, in the second display state, either one of control for hiding the display in the first display unit or control for lowering a brightness of the first display unit than the brightness in the first display state.

According to this configuration, a display state of the first display unit of the electronic device is controlled, by control of the electronic device control unit, corresponding to a positional relationship between the electronic device and the display device. Thus, the display state of the first display unit of the electronic device can be appropriately adjusted corresponding to the positional relationship between the electronic device and the display device.

Furthermore, according to an aspect of the invention, the display system can be executed by switching between an external operation mode where an operation of the electronic device is controlled based on an operation on the display device, and a normal operation mode where control of the operation of the electronic device is not performed based on an operation on the display device. Control of the display of the first display unit is executed based on the position of the first display unit with respect to the display device in the external operation mode, and either one of control for hiding the display in the first display unit or control for lowering a brightness of the first display unit than the brightness in the external operation mode is executed in the normal operation mode.

According to this configuration, the display of the second display unit can be controlled in accordance with the position of the electronic device corresponding to each of a case where the control of the operation of the electronic device is not performed based on an operation on the display device and a case where the operation of the electronic device is controlled based on the operation on the display device.

Furthermore, according to an aspect of the invention, the electronic device includes a position detection unit configured to evaluate a position of the first display unit with respect to the display device and a video processing unit configured to process data output to the display device. The video processing unit is configured to adjust at least one of a display position, a display size, and a shape of an image in a display region of the second display unit in accordance with the first display unit visually recognized through the second display unit, when the position of the first display unit detected by the position detection unit is included in the range of the external scenery visually recognized by the second display unit.

According to this configuration, the display state of the display device can be controlled in accordance with the position of the electronic device, by a function of the electronic device.

Furthermore, in order to solve the problem described above, a method of controlling a display system according to an aspect of the invention is a method of controlling a display system including an electronic device including a first display unit and a display device including a second display unit configured so that an external scenery is visually recognizable and the second display unit being configured to display an image in an overlapping manner with the external scenery. The method includes: displaying, in the second display unit, an image based on data input from the electronic device to the display device, detecting a position of the first display unit of the electronic device with respect to the display device, and adjusting a display in the second display unit when the position of the first display unit with respect to the display device is included in a range of the external scenery visually recognized by the second display unit.

According to the aspect of the invention, the display in the second display unit is adjusted to correspond to a positional relationship between the electronic device and the display device. Thus, a display by the display device can be controlled in accordance with a position of the electronic device.

Furthermore, in order to solve the problem described above, a display device according to an aspect of the invention includes a position detection unit configured to detect a position of a first display unit for an electronic device including the first display unit, a second display unit configured so that an external scenery is visually recognizable and the second display unit being configured to display an image in an overlapping manner with the external scenery, and a display control unit configured to cause the second display unit to display an image. The display control unit is configured to adjust a display in the second display unit when the position of the first display unit detected by the position detection unit is included in a range of the external scenery visually recognized by the second display unit.

According to the aspect of the invention, the display device adjusts the display in the second display unit corresponding to a positional relationship between the electronic device and the display device. Thus, a display by the display device can be controlled in accordance with a position of the electronic device being an external device.

Furthermore, in order to solve the problem described above, a method of controlling a display device according to an aspect of the invention is a method of controlling a display device including a display unit configured so that an external scenery is visually recognizable and the display unit being configured to display an image in an overlapping manner with the external scenery. The method includes: causing the display unit to display an image, detecting a position of a display screen of an electronic device including the display screen, and adjusting a display in the display unit when the detected position of the display screen is included in a range of the external scenery visually recognized by the display unit.

According to the aspect of the invention, the display device adjusts the display in the second display unit corresponding to a positional relationship between the electronic device and the display device. Thus, a display by the display device can be controlled in accordance with a position of the electronic device being an external device.

An aspect of the invention may be achieved in various forms other than the above-described display system, the method of controlling the display system, the display device, and the method of controlling the display device. For example, some aspects of the invention may be achieved in forms such as a program configured to execute the control method described above by a computer, a recording medium recording the program, a server device configured to distribute the program, a transmission medium configured to transmit the program, and a data signal embodying the program within a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Exemplary Embodiment 1-1. Configuration of Display System

Figure 1:
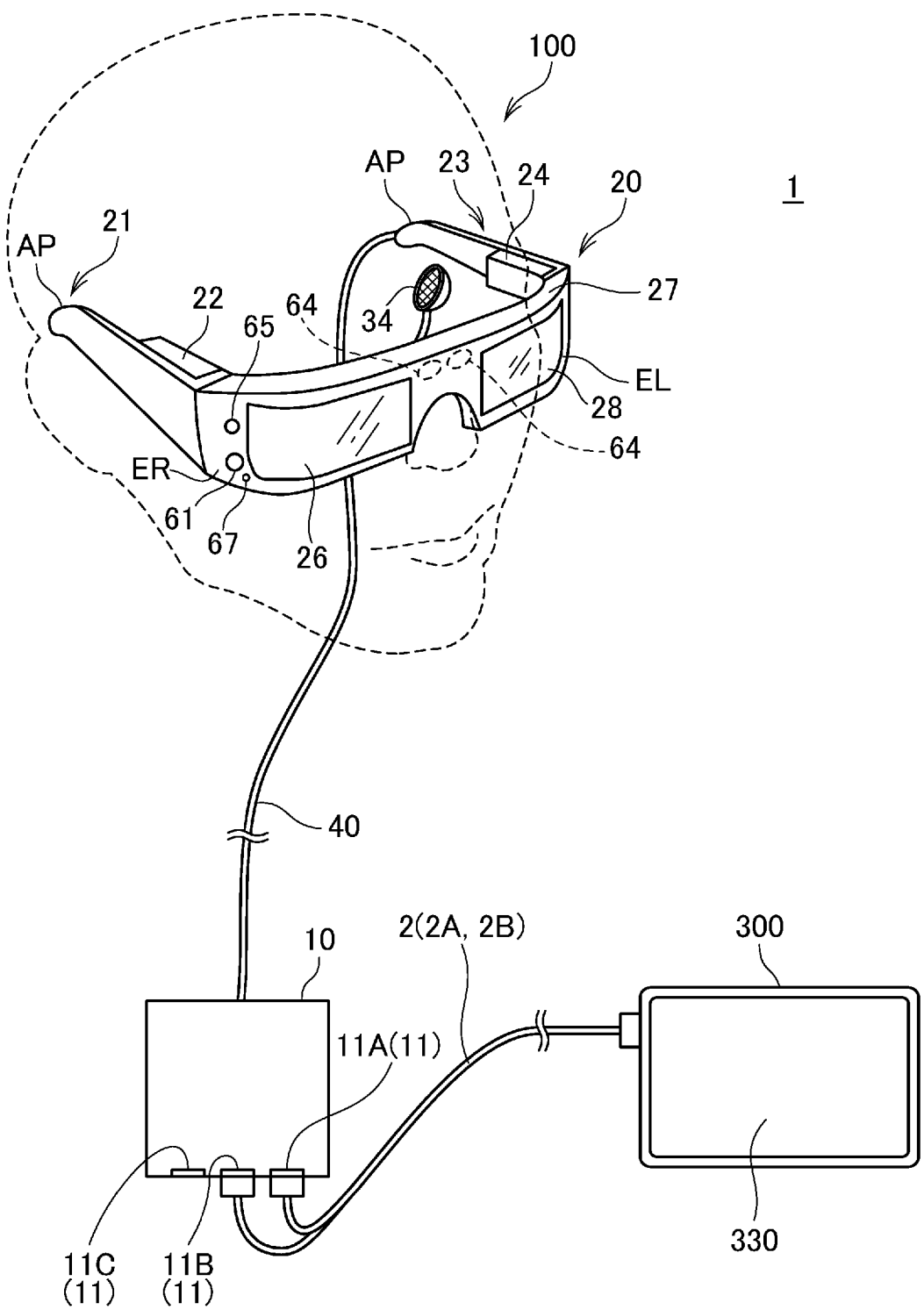
FIG. 1 is an appearance diagram of an HMD and a PC constituting a display system.

FIG. 1 is a diagram illustrating a configuration of a display system 1 according to a first exemplary embodiment to which the present invention is applied.

The display system 1 includes a Head Mounted Display (HMD) 100 and a Personal Computer (PC) 300 as an external device of the HMD 100.

The HMD 100 is a display device including an image display unit 20 (a second display unit) configured to cause a user to visually recognize a virtual image with being mounted on a head of the user, and a connection device 10 configured to control the image display unit 20. The connection device 10 includes a plurality of connectors 11 in a box-shaped case (also referred to as a housing or a main body). The image display unit 20 and the connection device 10 are connected by a connecting cable 40.

In the example of FIG. 1, the connection device 10 includes three connectors 11A, 11B, and 11C. In a description below, if not being provided with distinction, the connectors 11A, 11B, and 11C will be collectively referred to as a connector 11. The connector 11 is a wired interface configured to connect a communication cable and the connection device 10 is connected to an external device by the communication cable. The connectors 11A, 11B, and 11C conform, for example, a known communication interface standard and may be connectors having the same shape, or may be a different type of connectors from each other. In the present exemplary embodiment, as one example, the connector 11A is assumed to conform to a High Definition Multimedia Interface (HDMI) (registered trademark) standard. Furthermore, the connector 11B is assumed to be a Universal Serial Bus (USB)-Type C connector. Moreover, the connector 11C is assumed to be a Micro-USB connector.

In the example of FIG. 1, the connection device 10 and the PC 300 are connected by a cable 2. The cable 2 includes an HDMI cable 2A connecting the PC 300 and the connector 11A, and a USB cable 2B connecting the PC 300 and the connector 11B. In this example, the PC 300 is connected to the connection device 10 by an HMDI interface for video transmission and a USB interface for data communication.

The PC 300 is a computer including a display unit 330 configured to display an image and corresponds to an electronic device of the present invention. Preferably, the PC 300 is a portable-type computer and examples of the PC 300 include a tablet-type computer, a notebook-type computer, and a smart phone. The PC 300 in FIG. 1 includes the display unit 330 (a first display unit, display screen) on a surface of a flat-shaped main body. The display unit 330 includes a display panel 331 (FIG. 5) such as a liquid crystal display panel and an organic Electro Luminescent (EL) display panel, and a touch sensor 332 (FIG. 5) configured to detect a contact operation of the user is provided on a surface of the display panel 331.

The PC 300 functions as an external device with respect to the HMD 100. The external device includes a display screen and may be any electronic device including a function of displaying an image on the display screen; in the present exemplary embodiment, the PC 300 is illustrated merely as one example.

The image display unit 20 is a mounted body to be mounted on the user's head and is a so-called head-mounted display (HMD). That is, the HMD 100 has a configuration in which the connection device 10 for connecting an external device such as the PC 300 is connected to the image display unit 20 being an HMD main body. In the present exemplary embodiment, the image display unit 20 has the shape of spectacles. The image display unit 20 includes, in a main body including a right holding portion 21, a left holding portion 23, and a front frame 27, a right display unit 22 (display unit for right-eye), a left display unit 24 (display unit for left-eye), a right light-guiding plate 26, and a left light-guiding plate 28.

Each of the right holding portion 21 and the left holding portion 23 extends backwards from both end portions of the front frame 27 and holds the image display unit 20 on the user's head, like temples of spectacles. Here, among the both end portions of the front frame 27, the end portion located on the right side of the user is referred to as an end portion ER and the end portion located on the left side of the user is referred to as an end portion EL, with the image display unit 20 being mounted. The right holding portion 21 is arranged to extend from the end portion ER of the front frame 27 to a position corresponding to a right side head part of the user with the image display unit 20 being mounted. The left holding portion 23 is arranged to extend from the end portion EL to a position corresponding to a left side head part of the user with the image display unit 20 being mounted.

The right light-guiding plate 26 and the left light-guiding plate 28 are disposed on the front frame 27. The right light-guiding plate 26 is located in front of the user's right eye with the image display unit 20 being mounted and allows the right eye to visually recognize an image. The left light-guiding plate 28 is located in front of the user's left eye with the image display unit 20 being mounted and allows the left eye to visually recognize an image.

The front frame 27 has a shape in which one end of the right light-guiding plate 26 and one end of the left light-guiding plate 28 are coupled to each other and the coupling position corresponds to a part between the user's eyebrows with the user mounting the image display unit 20. In the coupling position of the right light-guiding plate 26 and the left light-guiding plate 28, the front frame 27 may be provided with a nose pad configured to abut against the user's nose with the image display unit 20 being mounted. In this case, the image display unit 20 can be held on the user's head by the nose pad, the right holding portion 21, and the left holding portion 23. Furthermore, a belt (not illustrated) coming in contact with the user's rear head portion with the image display unit 20 being mounted may be connected to the right holding portion 21 and the left holding portion 23, and in this case, the image display unit 20 can be held on the user's head by the belt.

The right display unit 22 and the left display unit 24 are each a module in which an optical unit and a peripheral circuit are unitized.

The right display unit 22 is a unit for an image display by the right light-guiding plate 26, is disposed in the right holding portion 21, and is located in the vicinity of the user's right side head portion with the image display unit 20 being mounted. The left display unit 24 is a unit for an image display by the left light-guiding plate 28, is disposed on the left holding portion 23, and is located in the vicinity of the user's left side head portion with the image display unit 20 being mounted. Note that the right display unit 22 and the left display unit 24 are collectively also simply referred to as "display drive unit".

The right light-guiding plate 26 and the left light-guiding plate 28 are optical units formed by a transmissive resin or the like and are configured to guide an image light output by the right display unit 22 and the left display unit 24, to the user's eye. The right light-guiding plate 26 and the left light-guiding plate 28 are prisms, for example.

A light control plate (not illustrated) may be disposed on the surface of the right light-guiding plate 26 and the left light-guiding plate 28. The light control plate is a sheet-shaped optical element having a different transmittance depending on a wavelength region of the light and functions as a so-called wavelength filter. For example, the light control plate is placed to cover a front side of the front frame 27 at the side opposite to a side of the user's eye. By appropriately selecting an optical property of the light control plate, transmittance of light of any wavelength region such as visible light, infrared light, and ultraviolet light can be controlled and a light amount of external light transmitting through the right light-guiding plate 26 and the left light-guiding plate 28 after entering the right light-guiding plate 26 and the left light-guiding plate 28 from the outside can be controlled.

The image display unit 20 guides an image light generated by each of the right display unit 22 and the left display unit 24, to the right light-guiding plate 26 and the left light-guiding plate 28 and displays the image by causing the user to visually recognize a virtual image by the image light. When the external light transmitted through the right light-guiding plate 26 and the left light-guiding plate 28 enters the user's eyes from the front of the user, image lights constituting a virtual image and the external light enter the user's eyes and thus, visibility of the virtual image is influenced by the strength of the external light. Thus, for example, by mounting the light control plate in the front frame 27 and appropriately selecting or adjusting the optical property of the light control plate, the visibility of the virtual image can be controlled. In a typical example, it is possible to use a light control plate having a light transmittance by which the user mounting the HMD 100 can at least visually recognize an external scenery. Furthermore, the use of the light control plate is expected to protect the right light-guiding plate 26 and the left light-guiding plate 28, and to prevent damage, deposition of dirt, and the like on the right light-guiding plate 26 and the left light-guiding plate 28. The light control plate may be detachable from the front frame 27 or each of the right light-guiding plate 26 and the left light-guiding plate 28, a plurality of types of light control plates may be exchanged and mounted, or the light control plate may be omitted.

Each of the right display unit 22 and the left display unit 24 of the image display unit 20 is connected to the connection device 10. In the HMD 100, the connecting cable 40 is connected to the left holding portion 23, a wire leading to the connecting cable 40 is laid inside the image display unit 20, and each of the right display unit 22 and the left display unit 24 is connected to the connection device 10.

A camera 61 is disposed in the front frame 27 of the image display unit 20. It is desirable that the camera 61 captures an image in a direction of an external scenery to be visually recognized by the user with the user mounting the image display unit 20, and the camera 61 is disposed on a front surface of the front frame 27 at a position where the external light transmitted through the right light-guiding plate 26 and the left light-guiding plate 28 is not obstructed. In the example of FIG. 1, the camera 61 is placed at the side of the end portion ER of the front frame 27. The camera 61 may be placed at the side of the end portion EL, or may be placed at a coupling portion of the right light-guiding plate 26 and the left light-guiding plate 28.

The camera 61 is a digital camera including an imaging element such as a CCD or a CMOS, an imaging lens and the like, and the camera 61 of the present exemplary embodiment is a monocular camera, however, the camera 61 may also include a stereo camera. The camera 61 captures an image of at least a part of an external scenery in a front side direction of the HMD 100, in other words, in a user's view direction with the user mounting the HMD 100. The external scenery can be replaced by the word "real space".

In other words, the camera 61 captures an image in a range or a direction overlapping with the user's view and to capture an image in direction in which the user gazes. A width of an angle of view of the camera 61 can be configured appropriately, however, in the present exemplary embodiment, the angle of view includes an external field visually recognized by the user via the right light-guiding plate 26 and the left light-guiding plate 28, as described later. More preferably, the imaging range of the camera 61 is configured so that the camera 61 can capture an image of the entire user's view visually recognizable through the right light-guiding plate 26 and the left light-guiding plate 28.

The HMD 100 includes a distance sensor 64. The distance sensor 64 is placed at a boundary portion between the right light-guiding plate 26 and the left light-guiding plate 28. The distance sensor 64 is located approximately in the middle of the user's both eyes in the horizontal direction and above the user's both eyes in the vertical direction, with the user mounting the image display unit 20.

The distance sensor 64 detects a distance to a measurement object located in a predetermined measurement direction. The measurement direction of the distance sensor 64 in the present exemplary embodiment is the front side direction of the HMD 100 and overlaps with an imaging direction of the camera 61.

Figure 2:
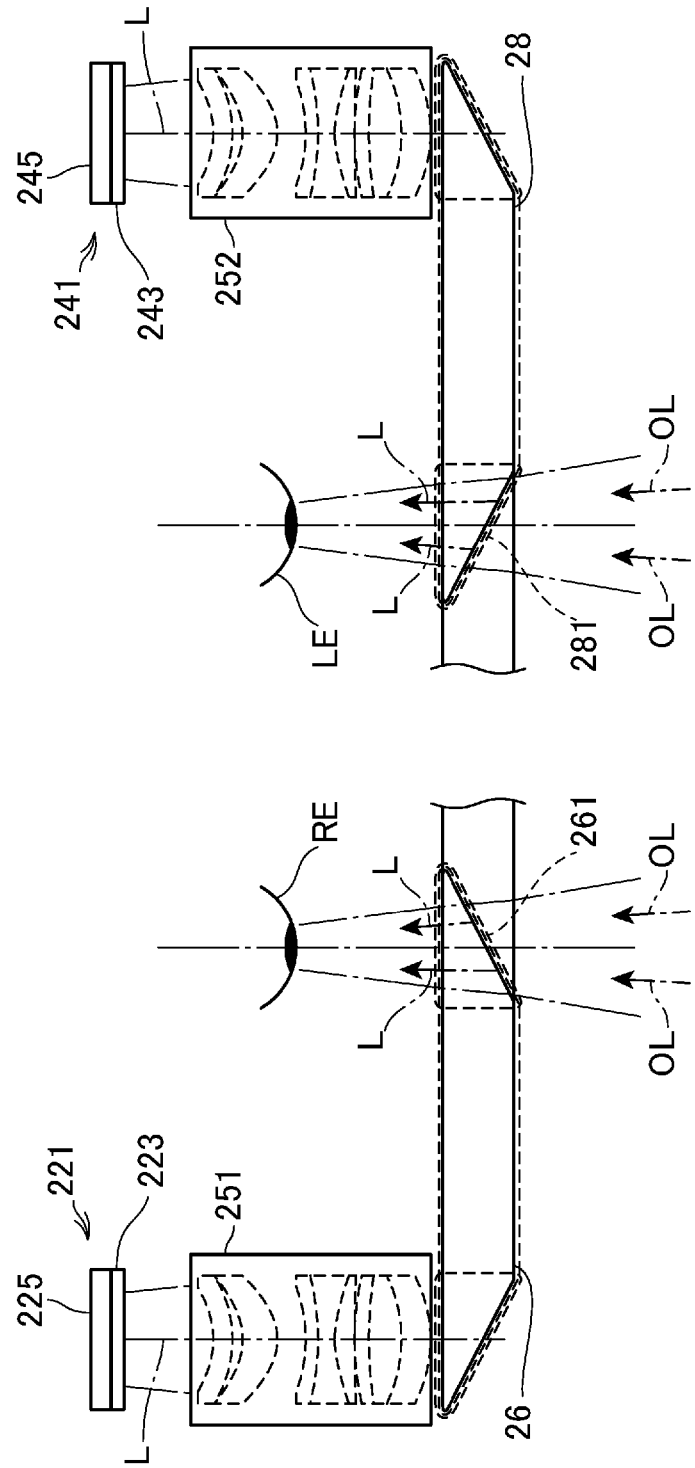
FIG. 2 is a diagram illustrating a configuration of an optical system of the HMD.

FIG. 2 is a plan view illustrating a main part of the configuration of the optical system of the HMD 100. For the purpose of description, the user's left eye LE and right eye RE are illustrated in FIG. 2.

As illustrated in FIG. 2, the right display unit 22 and the left display unit 24 are configured in left-right symmetry. For a configuration in which the user's right eye RE visually recognizes an image, the right display unit 22 includes an Organic Light Emitting Diode (OLED) unit 221 configured to emit an image light. Furthermore, the right display unit 22 includes a right optical system 251 including a lens group or the like configured to guide the image light L emitted from the OLED unit 221. The image light L is guided by the right optical system 251 to the right light-guiding plate 26.

The OLED unit 221 includes an OLED panel 223 and an OLED drive circuit 225 configured to drive the OLED panel 223. The OLED panel 223 is a self-luminous type display panel having a configuration in which light-emitting elements configured to emit colored light of each of R (red), G (green), and B (blue) by emitting light by organic electroluminescence, are arranged in a matrix. The OLED panel 223 includes a plurality of pixels in which a unit including each one element of R, G, and B is one pixel, and forms an image by the pixels arranged in a matrix.

The OLED drive circuit 225 causes the light-emitting elements of the OLED panel 223 to emit light by selecting the light-emitting elements included in the OLED panel 223 and supplying power to the light-emitting elements, based on image data input from the connection device 10. The OLED drive circuit 225 is fixed on a rear surface of the OLED panel 223, that is, on a rear side of the light-emitting surface, by bonding or the like. For example, the OLED drive circuit 225 may be constituted of a semiconductor device configured to drive the OLED panel 223 and may be implemented on a substrate (not illustrated) fixed on the rear surface of the OLED panel 223. A temperature sensor 217 is implemented on the substrate.

Note that the OLED panel 223 may have a configuration in which light-emitting elements configured to emit white light are arranged in a matrix and color filters corresponding to each color of R, G, and B are placed in an overlapping manner. Furthermore, an OLED panel 223 may be used in a WRGB configuration including, in addition to the light-emitting elements configured to emit colored light of each of R, G, and B, a light-emitting element configured to emit W (white) light.

The right optical system 251 includes a collimator lens for bundling the image light L emitted from the OLED panel 223 into a parallel light beam. The image light L bundled by the collimator lens into a parallel light beam enters the right light-guiding plate 26. A plurality of reflecting surfaces for reflecting the image light L are formed on an optical path to guide the light inside the right light-guiding plate 26. After being reflected a plurality of times inside the right light-guiding plate 26, the image light L is guided to the side of the right eye RE. The right light-guiding plate 26 is formed with a half mirror 261 (reflecting surface) located in front of the right eye RE. The image light L is reflected by the half mirror 261 and emitted from the right light-guiding plate 26 directed at the right eye RE and the image light L forms an image on a retina of the right eye RE to allow the user to visually recognize an image.

Furthermore, as a configuration for allowing the user's left eye LE to visually recognize an image, the left display unit 24 includes an OLED unit 241 configured to emit image light and a left optical system 252 including a lens group or the like configured to guide the image light L emitted from the OLED unit 241. The image light L is guided by the left optical system 252 to the left light-guiding plate 28.

The OLED unit 241 includes an OLED panel 243 and an OLED drive circuit 245 configured to drive the OLED panel 243. The OLED panel 243 is a self-luminous type display panel, configured similarly to the OLED panel 223. The OLED drive circuit 245 causes the light-emitting elements of the OLED panel 243 to emit light by selecting the light-emitting elements included in the OLED panel 243 and supplying power to the light-emitting elements, based on image data input from the connection device 10. The OLED drive circuit 245 is fixed on a rear surface of the OLED panel 243, that is, on a rear side of the light-emitting surface, by bonding or the like. For example, the OLED drive circuit 245 may be constituted of a semiconductor device configured to drive the OLED panel 243 and may be implemented on a substrate (not illustrated) fixed on the rear surface of the OLED panel 243. A temperature sensor 239 is implemented on the substrate.

The left optical system 252 includes a collimator lens configured to bundle the image light L emitted from the OLED panel 243 into a parallel light beam. The image light L bundled by the collimator lens into a parallel light beam enters the left light-guiding plate 28. The left light-guiding plate 28 is an optical element formed with a plurality of reflecting surfaces for reflecting the image light L and is a prism, for example. After being reflected a plurality of times inside the left light-guiding plate 28, the image light L is guided to the side of the left eye LE. The left light-guiding plate 28 is formed with a half mirror 281 (reflecting surface) located in front of the left eye LE. The image light L is reflected by the half mirror 281 and emitted from the left light-guiding plate 28 directed at the left eye LE and the image light L forms an image on a retina of the left eye LE to allow the user to visually recognize an image.

The HMD 100 functions as a see-through type display device. That is, the image light L reflected by the half mirror 261 and external light OL transmitted through the right light-guiding plate 26 enter the user's right eye RE. Furthermore, the image light L reflected by the half mirror 281 and the external light OL transmitted through the half mirror 281 enter the left eye LE. Thus, the HMD 100 emits the image light L of the image processed inside the HMD 100 and the external light OL in an overlapping manner to the user's eye, the user can see the external scenery through the right light-guiding plate 26 and the left light-guiding plate 28 and visually recognize the image resulting from the image light L in an overlapping manner with the external scenery. The half mirrors 261, 281 are image extraction units configured to extract an image by reflecting the image light output from each of the right display unit 22 and the left display unit 24 and can also be referred to as display units.

Note that the left optical system 252 and the left light-guiding plate 28 are collectively also referred to as "left light-guiding unit" and the right optical system 251 and the right light-guiding plate 26 are collectively referred to as "right light-guiding unit". Configurations of the right light-guiding unit and the left light-guiding unit are not limited to the examples described above; as long as image light is used to form a virtual image in front of the user's eye, any scheme can be applied, for example, by using a diffraction grating or a semitransmissive reflective film.

Figure 3:
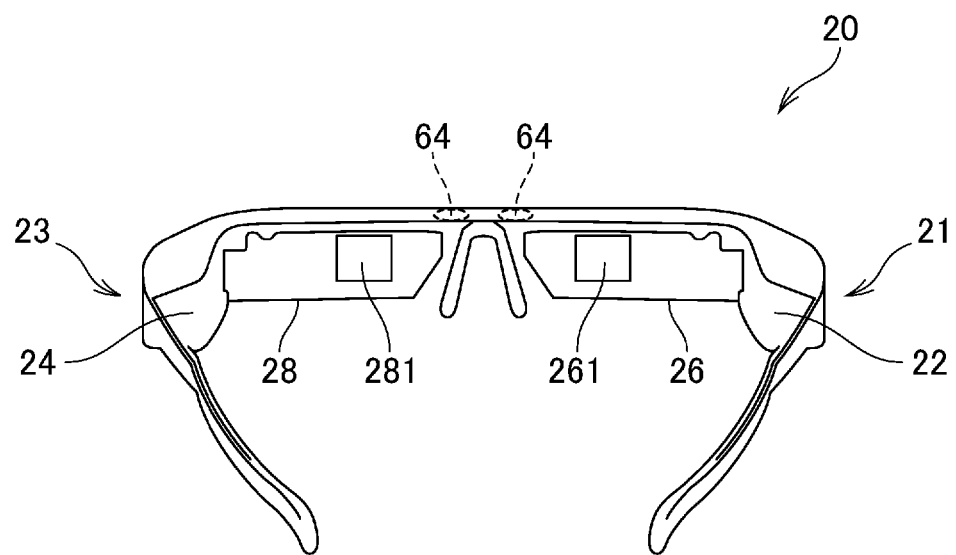
FIG. 3 is a perspective view of main parts of an image display unit seen from a head side of a user.

FIG. 3 is a perspective view of main parts of the image display unit 20 seen from a side of the user's head, and illustrates a side adjacent to the user's head of the image display unit 20, in other words, a side seen by the user's right eye RE and left eye LE. In other words, a rear side of the right light-guiding plate 26 and the left light-guiding plate 28 can be seen.

In FIG. 3, the half mirror 261 configured to irradiate image light into the user's right eye RE and the half mirror 281 configured to irradiate image light into the left eye LE can be seen as an approximately rectangular region. Furthermore, the entire right light-guiding plate 26 and left light-guiding plate 28 including the half mirrors 261 and 281 transmit the external light, as described above. Thus, the user can visually recognize the external scenery transmitted through the entire right light-guiding plate 26 and left light-guiding plate 28 and can visually recognize a rectangular display image at a position of the half mirrors 261 and 281.

Figure 4:
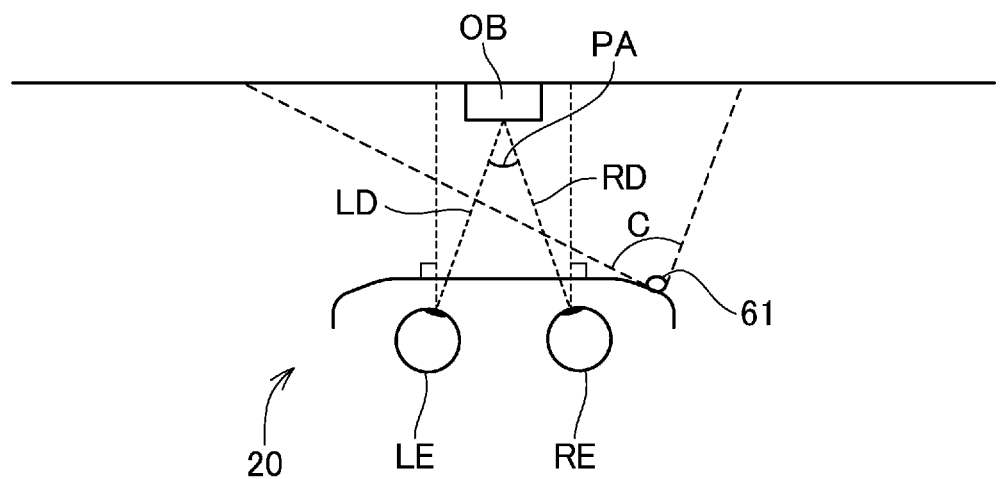
FIG. 4 is an explanatory diagram illustrating a correspondence between a display unit of the HMD and an imaging range.

FIG. 4 is an explanatory diagram illustrating a correspondence between the image display unit 20 of the HMD 100 and an imaging range.

As described above, the camera 61 is arranged at an end portion on the right side in the image display unit 20 and captures an image in a direction in which the user's both eyes are directed, that is, a front direction for the user.

FIG. 4 is a diagram schematically illustrating a position of the camera 61 in plan view, together with the user's right eye RE and left eye LE. An angle of view (imaging range) of the camera 61 is indicated by C. Note that an angle of view C in the horizontal direction is illustrated in FIG. 4, however, the actual angle of view of the camera 61 also ranges in an up-down direction, like a common digital camera.

An optical axis of the camera 61 is assumed to extend in a direction including a visual line direction RD of the right eye RE and a visual line direction LD of the left eye LE. The external scenery that the user can visually recognize with the user mounting the HMD 100 is not limited to an infinite scenery. For example, as illustrated in FIG. 4, when the user gazes at an object OB with both eyes, the user's visual lines RD and LD are directed at the object OB. In this case, a distance from the user to the object OB is likely to be from 30 cm to 10 m, more likely, from 1 m to 4 m. Here, a measure for an upper limit and a lower limit of the distance from the user to the object OB during normal use may be prescribed in the HMD 100. The measure may be evaluated by an examination or an experiment or may be prescribed by the user. It is preferable that, when the distance to the object OB during normal use corresponds to the prescribed measure of the upper limit and when the distance corresponds to the measure of the lower limit, the optical axis and the angle of view of the camera 61 are determined so that the object OB is included in the angle of view.

Furthermore, in general, a visual field angle of humans is about 200 degrees in the horizontal direction and about 125 degrees in the vertical direction and among this, an effective visual field having excellent information accommodation ability is about 30 degrees in the horizontal direction and about 20 degrees in the vertical direction. Moreover, a stable gazing field in which a gazing point that a person gazes at stabilizes rapidly to be seen, is about from 60 to 90 degrees in the horizontal direction and about from 45 to 70 degrees in the vertical direction. In this case, when the gazing point is the object OB in FIG. 4, the effective visual field is about 30 degrees in the horizontal direction and about 20 degrees in the vertical direction around the visual lines RD, LD. Furthermore, the stable gazing field is about from 60 to 90 degrees in the horizontal direction and about from 45 to 70 degrees in the vertical direction and the visual field angle is about 200 degrees in the horizontal direction and about 125 degrees in the vertical direction. Moreover, an actual visual field visually recognized by the user through the image display unit 20 and through the right light-guiding plate 26 and the left light-guiding plate 28 can be referred to as a field of view (FOV). In the configuration of the present exemplary embodiment illustrated in FIGS. 1 and 2, the field of view corresponds to an actual visual field visually recognized by the user through the right light-guiding plate 26 and the left light-guiding plate 28. The field of view is narrower than the visual field angle and the stable gazing field, but wider than the effective visual field.

It is preferable that the angle of view C of the camera 61 can capture an image of a range wider than the user's visual field, specifically, it is preferable that the angle of view C is at least wider than the user's effective visual field. Furthermore, it is more preferable that the angle of view C is wider than the field of view of the user. Even more preferably, the angle of view C is wider than the stable gazing field of the user, most preferably, the angle of view C is wider than the visual field angle of the user's both eyes.

The camera 61 may include a so-called wide-angle lens as the imaging lens and thus, may be configured to capture an image of a wide angle of view. The wide-angle lens may include a lens referred to as an ultra wide-angle lens or a semi wide-angle lens, may be a single-focus lens or may be a zoom lens, and may have a configuration in which the camera 61 includes a lens group formed by a plurality of lenses.

Furthermore, the camera 61 of the present exemplary embodiment is placed, as described above, at the side of the end portion ER in the front frame 27 of the image display unit 20, however, the camera 61 may be placed at the side of the end portion EL, or may be placed at the coupling portion of the right light-guiding plate 26 and the left light-guiding plate 28. In this case, a position of the camera 61 in the left-right direction is different from the position in FIG. 4 and the angle of view C is appropriately configured in accordance with the position of the camera 61. Specifically, when the camera 61 is at the side of the end portion EL, the angle of view C faces diagonally to the front right in FIG. 4. For example, when the camera 61 is placed at the coupling portion of the right light-guiding plate 26 and the left light-guiding plate 28, the angle of view C faces the front of the image display unit 20.

When the user looks at the object with the right eye RE and the left eye LE, the user perceives and recognizes the distance to the object by the angle formed by the visual line direction of the right eye RE and the visual line direction of the left eye LE. The angle is referred to as a convergence angle and when the user looks at the object OB illustrated in FIG. 4, for example, the convergence angle is PA.

When the user looks at the image displayed in the half mirrors 261 and 281, the convergence angle is an angle formed between the visual line direction when looking at the image on the half mirror 261 with the right eye RE and the visual line direction when looking at the image on the half mirror 281 with the left eye LE. In this case, the size of the convergence angle is decided depending on a display position of the image on the half mirrors 261 and 281. Accordingly, the convergence angle is controlled by adjusting the display position at which the right display unit 22 and the left display unit 24 display the image and thus, a distance feeling perceived by the visual sense by the user can be controlled. For example, a distance feeling (visually recognized distance) perceived by the user can be adjusted for the image displayed by the right display unit 22 and the left display unit 24.

Furthermore, the distance sensors 64 are placed facing forward in the center between the right light-guiding plate 26 and the left light-guiding plate 28.

1-2. Control System of Display System

Figure 5:
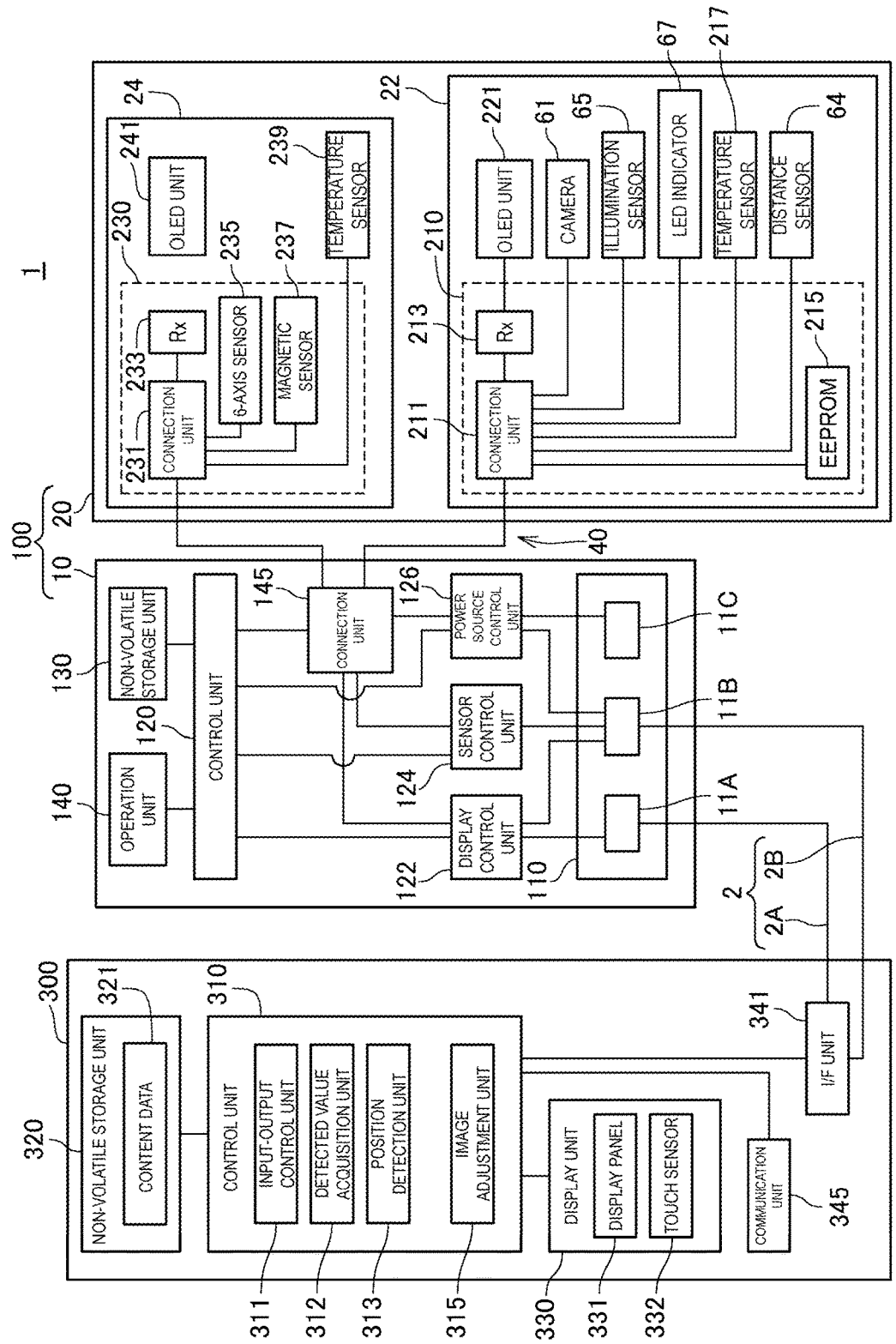
FIG. 5 is a block diagram of each component constituting the display system.

FIG. 5 is a block diagram illustrating a configuration of the HMD 100 and the PC 300 included in the display system 1.

As described above, the HMD 100 is configured by connecting the connection device 10 and the image display unit 20 by the connecting cable 40.

The image display unit 20 includes the right display unit 22 and the left display unit 24, as described above. The right display unit 22 includes a display unit substrate 210. A connection unit 211 for connecting to the connecting cable 40, a reception unit (Rx) 213 configured to receive data input from the connection device 10 via the connection unit 211, and an EEPROM 215 are mounted on the display unit substrate 210.

The connection unit 211 connects the reception unit 213, the EEPROM 215, the temperature sensor 217, the camera 61, the distance sensor 64, an illumination sensor 65, and an LED indicator 67, to the connection device 10.

The Electrically Erasable Programmable Read-Only Memory (EEPROM) 215 stores various types of data in a non-volatile manner. For example, the EEPROM 215 stores data related to a luminescence property and a display property of the OLED units 221 and 241 included in the image display unit 20, data related to a property of the sensors included in the right display unit 22 or the left display unit 24, and the like. Specifically, the EEPROM 215 stores a parameter for a gamma correction of the OLED units 221 and 241, data for compensating a detected value of the temperature sensors 217 and 239, and the like. These data are generated by an inspection at the time of factory shipment of the HMD 100 and written into the EEPROM 215. The data stored by the EEPROM 215 can be read by a control unit 120.

The camera 61 executes capturing an image according to a signal input via the connection unit 211 and outputs the captured image data to the connection unit 211.

As illustrated in FIG. 1, the illumination sensor 65 is disposed at the end portion ER of the front frame 27 and is placed to receive external light from the front of the user mounting the image display unit 20. The illumination sensor 65 outputs a detected value corresponding to the amount of received light (strength of the received light).

As illustrated in FIG. 1, the LED indicator 67 is placed near the camera 61 at the end portion ER of the front frame 27. The LED indicator 67 lights up while the camera 61 is executing capturing an image and thus notifies that the capturing the image is being performed.

The temperature sensor 217 detects the temperature and output, as the detected value, a voltage value or a resistance value corresponding to the detected temperature. The temperature sensor 217 is implemented at a side of the rear surface of the OLED panel 223 (FIG. 2). For example, the temperature sensor 217 may be implemented on the same substrate as that of the OLED drive circuit 225. In this configuration, the temperature sensor 217 mainly detects the temperature of the OLED panel 223.

The distance sensor 64 executes distance detection and outputs a signal indicating the detection result to the connection device 10 via the connection unit 211. For example, the distance sensor 64 may use an infrared depth sensor, an ultrasonic distance sensor, a Time of Flight (TOF) distance sensor, a distance detection unit combining image detection and voice detection, or the like. Furthermore, the distance sensor 64 may be configured to process an image obtained from stereo imaging by a stereo camera or a monocular camera to detect the distance.

In FIG. 5, one distance sensor 64 is illustrated, however, a pair of distance sensors 64 and 64 illustrated in FIG. 3 may operate simultaneously. Furthermore, each of the one pair of distance sensors 64 and 64 may be connected to the connection unit 211 and may be configured to operate independently.

The reception unit 213 receives image data for display transmitted from the connection device 10 via the connection unit 211 and outputs the image data to the OLED unit 221.

The left display unit 24 includes the display unit substrate 210. A connection unit 231 connected to the connecting cable 40 and a reception unit (Rx) 233 configured to receive data input from the connection device 10 via the connection unit 231 are implemented on the display unit substrate 210. Furthermore, a 6-axis sensor 235 and a magnetic sensor 237 are implemented on the display unit substrate 210.

The connection unit 231 connects the reception unit 233, the 6-axis sensor 235, the magnetic sensor 237, and the temperature sensor 239 to the connection device 10.

The 6-axis sensor 235 is a motion sensor (inertial sensor) including a 3-axis acceleration sensor and a 3-axis gyro (angular velocity) sensor. An Inertial Measurement Unit (IMU) in which the above-described sensors are modularized may be adopted as the 6-axis sensor 235. The magnetic sensor 237 is a 3-axis geomagnetic sensor, for example.

The temperature sensor 239 detects a temperature and outputs, as a detected value, a voltage value or a resistance value corresponding to the detected temperature. The temperature sensor 239 is implemented at a side of the rear surface of the OLED panel 243 (FIG. 3). For example, the temperature sensor 239 may be implemented on the same substrate as that of the OLED drive circuit 245. With this configuration, the temperature sensor 239 mainly detects the temperature of the OLED panel 243.

Furthermore, the temperature sensor 239 may be incorporated into the OLED panel 243 or the OLED drive circuit 245. Moreover, the substrate described above may be a semiconductor substrate. Specifically, when the OLED panel 243 is an Si-OLED and is implemented, together with the OLED drive circuit 245 and the like, as an integrated circuit on an integrated semiconductor chip, the temperature sensor 239 may be implemented on the semiconductor chip.

Each component in the image display unit 20 operates by power supplied from the connection device 10 via the connecting cable 40. The image display unit 20 may include a power source circuit (not illustrated) configured to perform voltage conversion and distribution of power supplied via the connecting cable 40.

The connection device 10 includes an interface (I/F) unit 110, the control unit 120, a display control unit 122, a sensor control unit 124, a power source control unit 126, a non-volatile storage unit 130, an operation unit 140, and a connection unit 145. The I/F unit 110 being an acquisition unit, includes the connectors 11A, 11B and 11C. Furthermore, the I/F unit 110 may include an interface circuit (not illustrated) connected to the connectors 11A, 11B and 11C and configured to execute a communication protocol conforming to various types of communication standards. Furthermore, the I/F unit 110 may be configured to receive power supplied via the connectors 11A, 11B and 11C.

For example, the I/F unit 110 may include an interface or the like for a memory card connectable to an external storage device or storage medium, or the I/F unit 110 may be constituted of a radio communication interface. For example, the I/F unit 110 may be an interface substrate on which the connectors 11A, 11B and 11C and the interface circuit are implemented. Furthermore, the control unit 120 and the display control unit 122, the sensor control unit 124, and the power source control unit 126 of the connection device 10 may be configured to be implemented on a connection device main substrate (not illustrated). In this case, the connectors 11A, 11B and 11C and the interface circuit of the I/F unit 110 may be implemented on the connection device main substrate.

The control unit 120 controls each component in the connection device 10. The control unit 120 includes a processor (not illustrated) such as a Central Processing Unit (CPU) and a microcomputer. The control unit 120 executes a program by the processor to control each component in the HMD 100 by a cooperation of software and hardware. Furthermore, the control unit 120 may be constituted of programmed hardware. The control unit 120 may include, in addition to the processor, a Random Access Memory (RAM) configured to form a work area and a Read Only Memory (ROM) configured to store a control program. Furthermore, the control unit 120 may be a semiconductor device integrating the processor, the RAM, and the ROM.

The non-volatile storage unit 130, the operation unit 140, and the connection unit 145 are connected to the control unit 120.

The display control unit 122 executes various types of processes for displaying, by the image display unit 20, an image based on image data and video data input to the I/F unit 110. For example, the display control unit 122 executes various types of processes such as frame cutting, resolution conversion (scaling), generation of intermediate frames, and frame rate conversion. The display control unit 122 outputs, to the connection unit 145, image data corresponding to each of the OLED unit 221 of the right display unit 22 and the OLED unit 241 of the left display unit 24. The image data input to the connection unit 145 is transmitted to the connection units 211 and 231 via the connecting cable 40.

When the video data input to the I/F unit 110 is 3D (three-dimensional) video data, for example, the display control unit 122 executes 3D video decoding. In the 3D video decoding process, the display control unit 122 generates, from the 3D video data, a frame for the right eye and a frame for the left eye. A format of the 3D video data input to the I/F unit 110 is, for example, a side-by-side format, a top-and-bottom format, a frame packing format, and the like, however, the format may also be 3D model data.

The display control unit 122 is connected to the connector 11A and the connector 11B included in the I/F unit 110. The display control unit 122 executes a process on video data input to the connector 11A and video data input to the connector 11B. Furthermore, the display control unit 122 may include a function of transmitting/receiving various types of control data related to video data transmission to/from a device connected to the connector 11A or the connector 11B.

The sensor control unit 124 controls the camera 61, the distance sensor 64, the illumination sensor 65, the temperature sensor 217, the 6-axis sensor 235, the magnetic sensor 237, and the temperature sensor 239. Specifically, the sensor control unit 124 configures and initializes a sampling period of each sensor according to the control by the control unit 120 and supplies power to each sensor, transmits control data, acquires detected values, and the like according to the sampling period of each sensor.

Furthermore, the sensor control unit 124 is connected to the connector 11B of the I/F unit 110 and outputs, at a predetermined timing, data related to a detected value acquired from each sensor, to the connector 11B. Thus, a device connected to the connector 11B can acquire a detected value of each sensor of the HMD 100 and image data captured by the camera 61. The data output by the sensor control unit 124 may be digital data including a detected value. Furthermore, the sensor control unit 124 may output data resulting from a calculation process based on a detected value of each sensor. For example, the sensor control unit 124 integrally processes detected values of a plurality of sensors and thus, functions as a so-called sensor fusion processing unit. By executing the sensor fusion, the sensor control unit 124 outputs data evaluated from the detected value of the sensor, for example, movement trajectory data of the image display unit 20, relative coordinate data of the image display unit 20, and the like. The sensor control unit 124 may include a function of transmitting/receiving various types of control data related to data transmission to/from a device connected to the connector 11B.

The display control unit 122 and/or the sensor control unit 124 may be achieved with the cooperation of software and hardware by a processor such as the CPU executing a program. That is, the display control unit 122 and the sensor control unit 124 are constituted by a processor and execute a program to execute the operation described above. In this example, the display control unit 122 and the sensor control unit 124 may be achieved when the processor constituting the control unit 120 executes the program. In other words, by executing a program, the processor may function as the control unit 120, the display control unit 122, and the sensor control unit 124. Here, the processor can also be replaced with a computer.

Furthermore, the display control unit 122 and the sensor control unit 124 may be constituted of a programmed hardware such as a Digital Signal Processor (DSP) and a Field Programmable Gate Array (FPGA). Moreover, the display control unit 122 and the sensor control unit 124 may be integrated to be configured as a System-on-a-Chip (SoC)-FPGA.

The power source control unit 126 is connected to the connector 11B and the connector 11C included in the I/F unit 110. The power source control unit 126 supplies power to each component of the connection device 10 and the image display unit 20, based on power supplied from the connectors 11B, 11C. Furthermore, the power source control unit 126 incorporates a voltage conversion circuit (not illustrated) and may be configured to be able to supply different voltage to each component of the connection device 10 and the image display unit 20. The power source control unit 126 may be constituted of a programmed semiconductor device such as a logical circuit or an FPGA. Furthermore, the power source control unit 126 may be configured of hardware (including a processor) common with the display control unit 122 and/or the sensor control unit 124.

The display control unit 122, the sensor control unit 124, and the power source control unit 126 may include a work memory for performing data processing and may utilize a work area of a RAM (not illustrated) included in the control unit 120 to perform the processing.

The control unit 120 reads data from the EEPROM 215 included in the right display unit 22 and configures an operation of the display control unit 122 and the sensor control unit 124, based on the read data. Furthermore, the control unit 120 causes each component including the display control unit 122, the sensor control unit 124, and the power source control unit 126 to operate, in accordance with an operation in the operation unit 140. Moreover, the control unit 120 identifies a device connected to the display control unit 122, the sensor control unit 124, and the power source control unit 126 via the I/F unit 110, and controls the display control unit 122, the sensor control unit 124, and the power source control unit 126 so that an operation appropriate for each of the devices is performed.

Furthermore, the control unit 120 controls a start and stop of power supply to the LED indicator 67. For example, the control unit 120 lights up or blinks the LED indicator 67 in response to a timing when the camera 61 starts and terminates capturing an image.

The non-volatile storage unit 130 is a storage device configured to store in a non-volatile manner data and the like to be processed by the control unit 120. For example, the non-volatile storage unit 130 is a magnetic recording device such as a Hard Disk Drive (HDD) or a storage device using a semiconductor storage element such as a flash memory.

Furthermore, the connection device 10 may include a rechargeable battery (not illustrated) and may be configured to supply power from the battery to each component of the connection device 10 and the image display unit 20.

The PC 300 includes a control unit 310, a non-volatile storage unit 320, a display unit 330, an interface (I/F) unit 341, and a communication unit 345. The control unit 310 (electronic device-control unit) includes a processor (not illustrated) such as a CPU or a microcomputer, and executes a program with the processor to control each component of the PC 300. The control unit 310 may include a ROM configured to store in a non-volatile manner a control program to be executed by the processor (a so-called computer) and a RAM configured to include the work area of the processor.

The non-volatile storage unit 320 stores in a non-volatile manner a program to be executed by the control unit 310 and data to be processed by the control unit 310. The non-volatile storage unit 130 is a magnetic recording device such as an HDD or a storage device using a semiconductor storage element such as a flash memory.

The non-volatile storage unit 320 stores, for example, content data 321 of a content including a video. The content data 321 is a file having a format processable by the control unit 310 and may include video data and voice data.

Furthermore, the non-volatile storage unit 320 stores an operating system (OS) as a basic control program to be executed by the control unit 310, an application program operating with the OS as platform, and the like. Moreover, the non-volatile storage unit 320 stores data to be processed when the application program is executed and data resulting from the process.

The display panel 331 and the touch sensor 332 included in the display unit 330 are connected to the control unit 310. The display panel 331 displays various types of images based on the control of the control unit 310. The touch sensor 332 detects a touch operation and outputs data indicating the detected operation to the control unit 310. The data output by the touch sensor 332 is coordinate data indicating an operation position in the touch sensor 332, and the like.

The I/F unit 341 is an interface to be connected to an external device and corresponds to an output unit of the present invention. For example, the I/F unit 341 executes communication conforming to the standard of an HDMI interface, a USB interface, and the like. The I/F unit 341 includes a connector (not illustrated) for connecting a cable (for example, the cable 2) and an interface circuit (not illustrated) configured to process a signal transmitted by the connector. The I/F unit 341 is an interface substrate including the connector and the interface circuit and is connected to a main substrate to be implemented with the processor of the control unit 310 or the like. Alternatively, the connector and the interface circuit included in the I/F unit 341 are implemented on the main substrate of the PC 300. In the present exemplary embodiment, the I/F unit 341 includes an HDMI interface and a USB interface and is connected to the connectors 11A and 11B by the HDMI cable 2A and the USB cable 2B. For example, the control unit 310 outputs video data via the HDMI cable 2A and receives data related to an output value of a sensor from the connection device 10 via the USB cable 2B. The I/F unit 341 can independently perform communication via the HDMI cable 2A and communication via the USB cable 2B. Furthermore, the I/F unit 341 may be a radio communication interface. In this case, the I/F unit 341 can be achieved by an interface substrate implemented with a communication circuit including the RF unit or a circuit to be implemented on the main substrate.

The communication unit 345 is a communication interface configured to execute data communication with an external device. The communication unit 345 may be a wired communication interface to which a cable can be connected, or may be a radio communication interface. For example, the communication unit 345 may be a wired LAN interface corresponding to Ethernet (registered trademark) or may be a wireless LAN interface corresponding to the IEEE 802.11 standard.

By executing a program as described above, the control unit 310 functions as an input-output control unit 311, a detected value acquisition unit 312, a position detection unit 313, and an image adjustment unit 315.

The input-output control unit 311 detects an input by the user. Based on the input detected by the input-output control unit 311, the control unit 310 executes display control such as switching of a screen to be displayed on the display unit 330 and an operation such as starting or terminating execution of the application program. Furthermore, the input-output control unit 311 controls an input/output of data to/from the I/F unit 341 and the communication unit 345.

The control unit 310 executes two operation modes in which a process of detecting an input is different. That is, the control unit 310 switches and executes display modes between a host device display mode for detecting an input operation performed by the user on the PC 300 and an HMD display mode for detecting, as an input operation on the PC 300, an operation on the HMD 100. The host device display mode corresponds to a normal operation mode of the present invention and the HMD display mode corresponds to an external operation mode of the present invention.

In the host device display mode, the input-output control unit 311 detects an input by the user based on data input from the touch sensor 332.

In the HMD display mode, the input-output control unit 311 acquires data input to the I/F unit 341, as operation data indicating an operation on the HMD 100. The operation data is output from the connector 11B of the connection device 10 via the USB interface. The substance of the operation data is an output value of a sensor included in the HMD 100 or data resulting from processing of the output value of the sensor by the connection device 10.

The detected value acquisition unit 312 acquires, from the connection device 10 connected by the I/F unit 341, data related to a detected value of each sensor included in the HMD 100. The detected value acquisition unit 312 acquires, from the connection device 10, image data captured by the camera 61, as well as data related to a detected value of the distance sensor 64, the illumination sensor 65, the EEPROM 215, the 6-axis sensor 235, the magnetic sensor 237, the temperature sensor 239, and the like. The data acquired by the detected value acquisition unit 312 is data processed by the sensor control unit 124, and may be data including the detected value of each sensor and data statistically processed by the sensor control unit 124.

The position detection unit 313 detects a position of the HMD 100 based on data acquired by the detected value acquisition unit 312. More specifically, the position detection unit 313 detects a relative position between the PC 300 and the image display unit 20. Here, the relative position detected by the position detection unit 313 may be a position in a space where the image display unit 20 and the PC 300 exist and may include a relative orientation between the display unit 330 and the image display unit 20. For example, the relative position may be information indicating a position and/or a direction of the display unit 330 with the image display unit 20 as reference. Furthermore, the relative position may be, for example, information indicating a position and/or a direction of the image display unit 20 with the PC 300 as reference. Moreover, the relative position may include, for example, a coordinate in a three-dimensional coordinate system configured in a space where the image display unit 20 and the PC 300 exist.

A position detection by the position detection unit 313 will be described later.

The video data output by the PC 300 to the connection device 10 can be video data of a screen displayed by the PC 300 via the display unit 330, additionally to video data provided by reproducing the content data 321. In this case, the connection device 10 displays the same screen as the display unit 330, and thus, performs a so-called mirroring display.

1-3. Calibration of Display System

Figure 6:
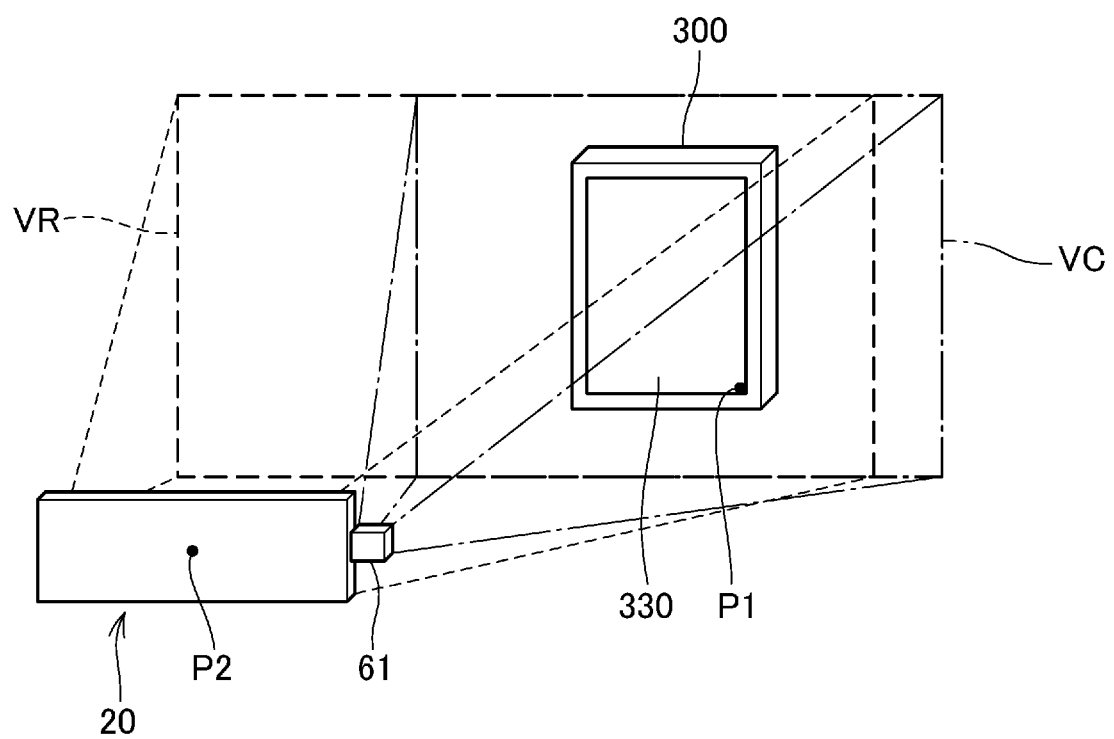
FIG. 6 is an explanatory diagram illustrating a process of evaluating a relative position of a PC with respect to an image display unit.
Figure 7:
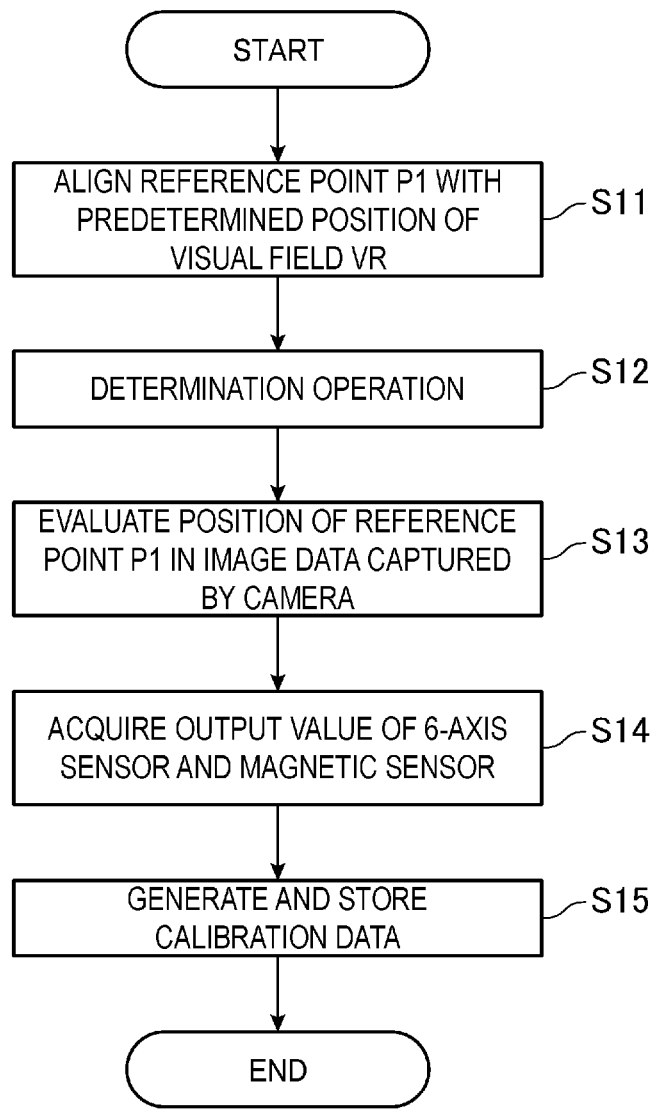
FIG. 7 is a flowchart illustrating an operation of the display system.

FIG. 6 is an explanatory diagram illustrating a process of evaluating a relative position of the PC 300 with respect to the image display unit 20 and in particular, illustrates a calibration process. FIG. 7 is a flowchart illustrating an operation of the display system 1 and in particular, illustrates an operation of the PC 300 in the calibration process.

In FIG. 6, a visual field visually recognized by the user through the image display unit 20 is indicated by a reference sign VR and an imaging range of the camera 61 is indicated by a reference sign VC. In this example, the imaging range VC overlaps but does not coincide with the visual field VR. The imaging range VC and the visual field VR may coincide and the imaging range VC may be included in the visual field VR.

As illustrated in FIG. 6, the calibration is performed by using the display system 1 in a state where the PC 300 exists in the imaging range VC of the camera 61.

In the present exemplary embodiment, a reference point P1 is set in the display unit 330 and a reference position P2 is set in the image display unit 20. The reference point P1 is an indication visually perceivable by the user, and thus, is a so-called marker. The PC 300 can detect the reference point P1 from image data captured by the camera 61 through an image process. The reference position P2 is set as a reference of a position in the image display unit 20, and may be a virtual position. There may be no indication or object indicating the reference position P2.

The reference point P1 may be an explicitly visually recognizable object or position and it is not necessary to newly provide an indication or an object as the reference point P1. A specific position of a pattern or a shape of the display unit 330 may be set as the reference point P1, for example, by choosing one point among the four corners of the display unit 330 as the reference point P1.

FIG. 7 is a flowchart illustrating an operation of the display system 1 and illustrates an operation of the PC 300 configured to perform calibration.

In the calibration, the user moves the head or the image display unit 20 so that the reference point P1 is located at a predetermined position in the visual field VR of the user (step S11). When the position set in the visual field VR and the reference point P1 overlap, the user performs, on the image display unit 20 or the PC 300, an operation for determining the position (step S12). For example, the user performs a knocking operation on the front frame 27 of the image display unit 20. The operation can be detected by the 6-axis sensor 235 as an acceleration. Furthermore, when a knock sensor (not illustrated) is mounted on the image display unit 20, the operation can be detected based on a detected value of the knock sensor. The operation of step S12 may be an operation detected by the touch sensor 332. Furthermore, in step S12, the PC 300 may detect an operation by a voice. That is, a microphone is mounted in the PC 300 and in a configuration in which the control unit 310 can process the voice collected by the microphone, the control unit 310 can execute a voice recognition process of converting the voice into a text or a voice command detection process of detecting a voice of a pattern registered in advance. In this configuration, the control unit 310 may detect, in step S12, a voice uttered by the user, as an input operation.

The control unit 310 acquires image data captured by the camera 61 when detecting the operation of step S12 to evaluate the position of the reference point P1 in the image data captured by the camera 61 (step S13). As a result, a position in the image data captured by the camera 61 and a position in the visual field VR of the user mounting the image display unit 20 are associated. Therefore, when the PC 300 is captured in the image data captured by the camera 61, a relative position of the PC 300 with respect to the visual field VR can be specified from the captured image data.

The control unit 310 acquires data related to output values of the 6-axis sensor 235 and the magnetic sensor 237 (step S14). The output values of the sensors acquired in step S14 indicate a reference position of the image display unit 20 with the reference point P1 overlapping with a setting position of the visual field VR. For example, by integrating the output values of the 6-axis sensor 235, it is possible to evaluate a direction and an amount of movement of the image display unit 20 having moved from the reference position. Furthermore, based on the output value of the magnetic sensor 237, a relative direction of the image display unit 20 with respect to the reference position of the image display unit 20 can be evaluated. Thus, a relative position between the image display unit 20 and the PC 300 can be evaluated.

The control unit 310 generates calibration data including the output value acquired in step S14, stores the data in the non-volatile storage unit 320 (step S15), and terminates the present process.

For example, step S13 and step S15 are executed by the position detection unit 313 and step S14 is executed by the detected value acquisition unit 312.

In the calibration process illustrated in FIG. 7, the reference point P1 of the PC 300 and the position set in the visual field VR are aligned to be associated with a relative positional relationship of the image display unit with respect to the reference position of the image display unit. The calibration data generated in the process is, for example, data indicating a reference of a relative position between the reference point P1 and the visual field VR. In the calibration, in addition to a process of overlapping a predetermined position in the visual field VR with the reference point P1 and a process may be adopted in which the PC 300 is placed at a predetermined distance from the image display unit 20 in step S11. For example, in step S11, an image for guiding the PC 300 to be located away from the image display unit 20 by a predetermined distance may be displayed by the image display unit 20. The image can be a marker such as a straight line, a rectangle, and a point indicating a visually recognized size of the PC 300 located away from the image display unit 20 by the predetermined distance. The user may adjust a relative position of the PC 300 with respect to the user so that the PC 300 is seen in an overlapping manner with the marker of the image display unit 20 and afterwards, may align the reference point P1 to the predetermined position and perform the operation of step S12.

1-4. Display Form of HMD

Figure 8:
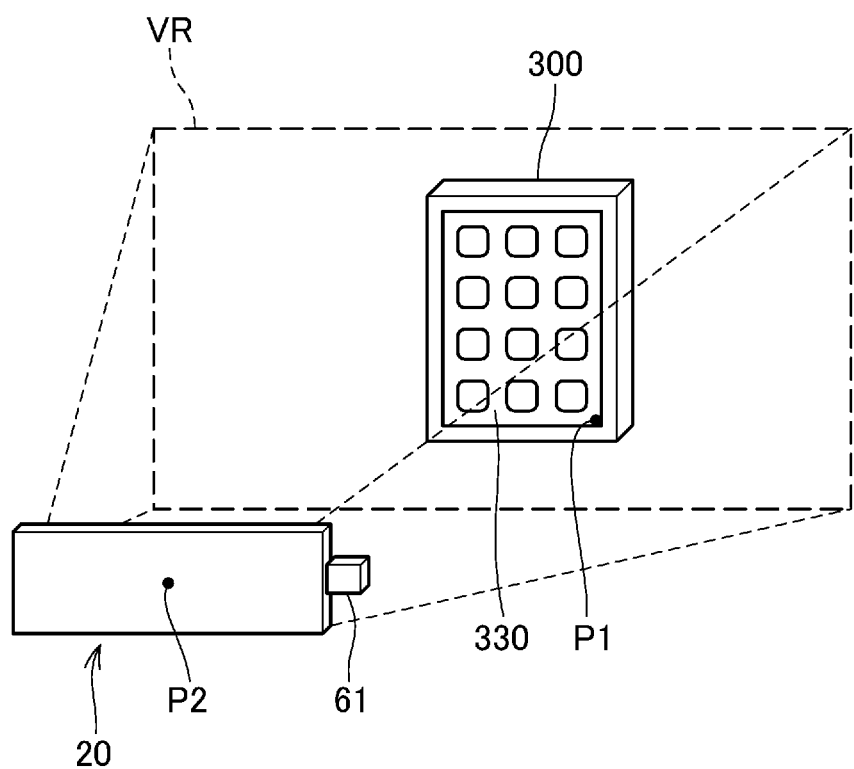
FIG. 8 is a diagram illustrating an example of a display form in a host device display mode.
Figure 9:
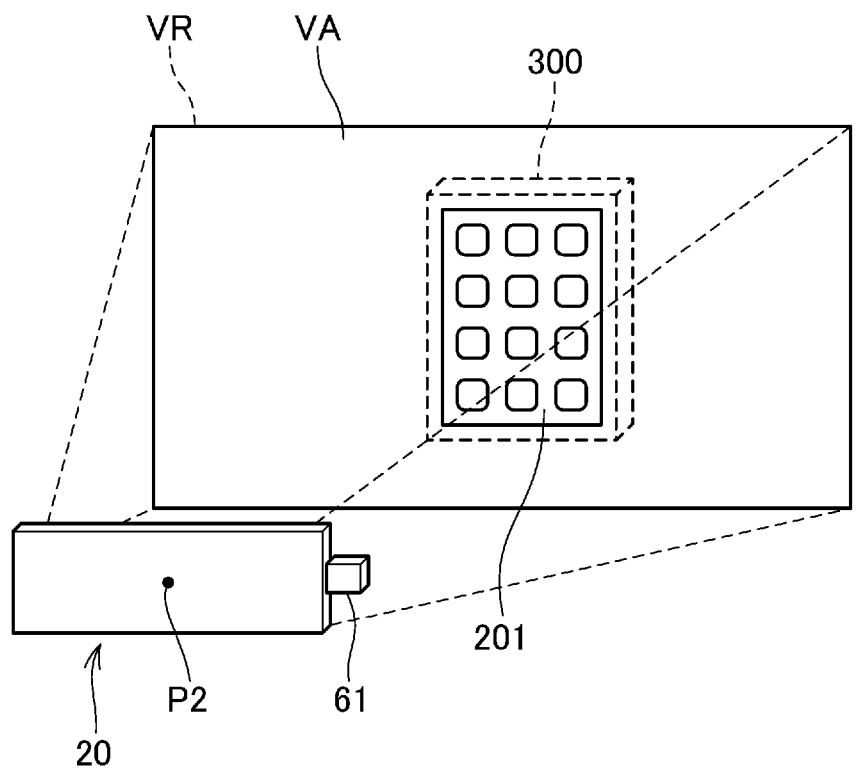
FIG. 9 is a diagram illustrating an example of a display form in an HMD display mode.
Figure 10:
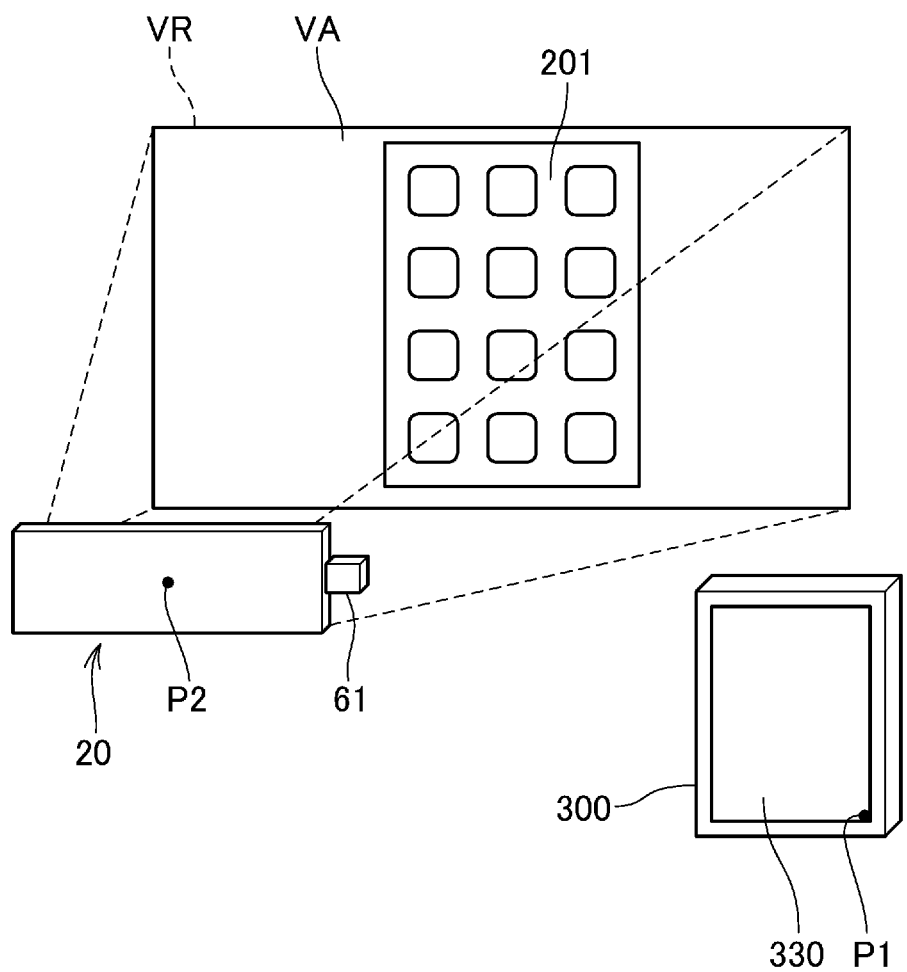
FIG. 10 is a diagram illustrating another example of a display form in the HMD display mode.

FIGS. 8, 9, and 10 are drawings each illustrating an example of a display form of the display system 1 in the present exemplary embodiment. In FIGS. 8, 9, and 10, a visual field visually recognizable through the image display unit 20 by the user mounting the image display unit 20 is denoted as the visual field VR. Furthermore, in the examples of the drawings, a display region where the image display unit 20 displays the image to be visually recognizable by the user, is of the same size and at the same position as the visual field VR and overlaps with the visual field VR. The present invention is also applicable to a configuration where the display region of the image display unit 20 is smaller than the visual field VR.

FIG. 8 illustrates a display form of the display system 1 in the host device display mode. The host device display mode is an operation mode where the PC 300 executes various types of operations based on an operation on the touch sensor 332. In the host device display mode, the PC 300 displays, on the display unit 330, various types of images functioning as a user interface. In the host device display mode, the HMD 100 does not display an image or displays an image different from a screen displayed in the display unit 330.

In the example of FIG. 8, an image in which a plurality of icons are arranged is displayed as user interfaces on the display unit 330. Furthermore, the image display unit 20 does not display an image. Thus, the display image of the image display unit 20 is not visually recognizable in the visual field VR or an icon or the like is displayed indicating that the display is off.

In the HMD display mode, an operation detected by the sensors included in the HMD 100 is received by the PC 300 as an input operation on the PC 300. In this case, the PC 300 acquires data including the output value of the sensors or a processing result of the output values of the sensors from the connection device 10 and performs a process based on the acquired data. Thus, in the HMD display mode, a display image 201 displayed by the image display unit 20 is employed as a reference of the operation and thus, visibility of the display image 201 is prioritized over the display image of the display unit 330.

FIG. 9 illustrates a display form of the display system 1 in the HMD display mode. In the HMD display mode, the PC 300 outputs image data of the image displayed in the display unit 330, via the HDMI cable 2A. Thus, the same image can be displayed by the display unit 330 and the image display unit 20, and therefore, a so-called mirroring is performed.

In the HMD display mode, when the display unit 330 is included in the visual field VR because of the positional relationship between the image display unit 20 and the PC 300, the user can see the display image of the image display unit 20 and the display image of the display unit 330 in an overlapping manner. The image display unit 20 and the display unit 330 display the same image, and thus, the user does not need to visually recognize both of the display image of the image display unit 20 and the display image of the display unit 330, for example, it is useful that only either one of the display images can be clearly visually recognizable.

Here, in the present exemplary embodiment, the display system 1 switches control according to the display in the HMD display mode, in accordance with whether or not the display unit 330 is included in the visual field VR of the image display unit 20.

In FIG. 9, a display region where the image display unit 20 displays an image is indicated by a reference sign VA. The display region VA is a region recognized by the user by image light emitted from the half mirrors 261 and 281 and it is not intended that the position where the display region actually exists is limited to the position illustrated in FIG. 9. In the example of FIG. 9, the display region VA is arranged over nearly the entire visual field VR, however, the display region VA may be smaller than the visual field VR.

FIG. 9 illustrates an example where the display unit 330 is included in the visual field VR in the HMD display mode. Furthermore, in the example of FIG. 9, the display unit 330 as the external scenery, overlaps with the display region VA. The same display image 201 as the image displayed in the display unit 330 is displayed in the image display unit 20. In the image display unit 20, the display image 201 is displayed to overlap with the position of the display unit 330 visually recognized as the external scenery through the visual field VR. The display image 201 is an image displayed on the image display unit 20 based on video data to be output by the PC 300 to the connection device 10 and is an image mirroring the display image of the display unit 330.

When the display unit 330 is included in the visual field VR in the HMD display mode, the PC 300 adjusts a display state of the display unit 330 to a state different from the host device display mode that is the normal operation state. Specifically, the control unit 310 lowers a display brightness of the display unit 330 than that in the host device display mode or turns off the display. In the example of FIG. 9, the display of the display unit 330 is off. In FIG. 9, the PC 300 is visually recognized as the external scenery through the image display unit 20, and thus, the PC 300 is illustrated by dashed lines. The visibility of the image displayed by the display unit 330 decreases by the control, and thus, the display image of the display unit 330 is not easily visible to the user mounting the image display unit 20. Therefore, the display image 201 displayed by the image display unit 20 can be satisfactorily visually recognized by the user.

The display position of the display image 201 is aligned to the position of the display unit 330 and thus, the display image 201 is visually recognized by the user as if the display image 201 is an image displayed on the display unit 330.

Furthermore, when the display unit 330 is included in the visual field VR in the HMD display mode, a convergence angle when displaying the display image 201 by the image display unit 20 is adjusted in accordance with a distance from the image display unit 20 to the display unit 330.

FIG. 10 illustrates an example where the display unit 330 is not included in the visual field VR in the HMD display mode and the display unit 330 is located outside of the display region VA. The same display image 201 as the image displayed by the display unit 330 is displayed in a mirroring manner in the image display unit 20. A display size and position of the display image 201 does not need to match with those of the display unit 330, and thus, the display position and the display size of the display image 201 are not limited. For example, the display image 201 may be displayed in a maximum size displayable in the display region VA to increase visibility or in an initialized display size. Furthermore, the display position may be in the center of the display region VA. The display position and the display size of the display image 201 may be configured a default setting, for example. As one example of the default setting, the display image 201 is configured to be displayed over the entire display region VA.

When the display unit 330 does not overlap with the display region VA, the PC 300 may display an image on the display unit 330. In this case, a display state in which the display unit 330 displays the image is the same as that in the host device display mode. Furthermore, the display of the display unit 330 may be normally off in the HMD display mode.

A case where the display unit 330 is included in the visual field VR refers to a case where the user mounting the HMD 100 can visually recognize, as the external scenery, the display unit 330 of the PC 300 through the image display unit 20. Here, a visual field of the right eye RE and the left eye LE through the image display unit 20, that is, a range of the external scenery visible to the user, can be evaluated from the direction of the image display unit 20. Furthermore, as illustrated in FIG. 4, when a relationship between the angle of view of the camera 61 and the visual field of the right eye RE and the left eye LE upon viewing the external scenery through the image display unit 20 is known, the control unit 310 can determine, from image data captured by the camera 61, whether or not the display unit 330 is within the visual field. Thus, it can be determined whether or not the display unit 330 is included in the visual field VR, based on the above described calibration data, the image data captured by the camera 61, and the like.

1-5. Operation of Display System

Figure 11:
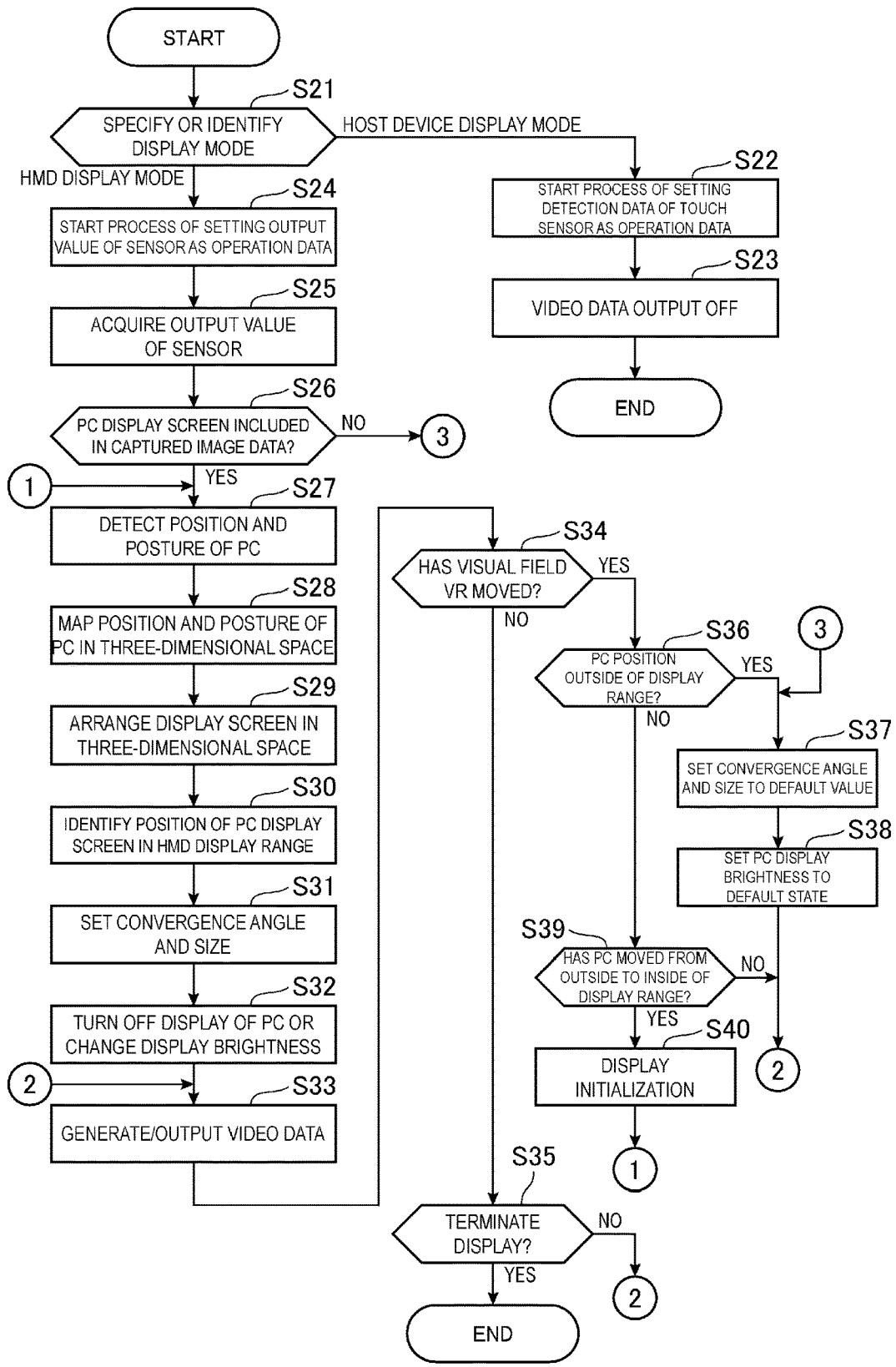
FIG. 11 is a flowchart illustrating an operation of the display system.

FIG. 11 is a flowchart illustrating an operation according to the display of the display system 1 and in particular, illustrates an operation of the PC 300. In the present exemplary embodiment, the HMD 100 is configured to display an image based on the video data output by the PC 300 via the HDMI cable 2A and the PC 300 is configured to perform display control based on the relative position between the image display unit 20 and the PC 300.

For example, the operation in FIG. 11 is started on condition of detecting that the PC 300 is connected to the connection device 10 via the cable 2.

First, an instruction or identification whether to execute the HMD display mode or to execute the host device display mode as the display mode is performed in the PC 300 (step S21). In step S21, the display mode is specified by an operation of the user on the PC 300 and the control unit 310 detects the specified display mode. Alternatively, the control unit 310 may identify a display mode configured for the PC 300, in step S21.

Furthermore, when starting the operation in FIG. 11, whether to execute the HMD display mode or to execute the host device display mode as the display mode, may be set as the initial setting. The initial setting may be set via an operation on the PC 300 by the user or may be a so-called default setting.

When executing the host device display mode, the control unit 310 starts a process of setting detection data of a detected operation on the touch sensor 332 as the operation data for the PC 300 (step S22). The control unit 310 stops the output of video data via the cable 2 (step S23) and terminates this process. Note that, in the host device display mode, the PC 300 may output any video data according to an image or a video other than the display image of the display unit 330. For example, in step S23, the control unit 310 may output, to the connection device 10, video data reproducing the content data 321 via the cable 2.

Note that the PC 300 may output the video data via the cable 2 in the host device display mode, and in this case, when the control unit 120 or the display control unit 122 of the connection device 10 stops the display, a similar operation can be realized. In this case, the PC 300 may output, to the connection device 10, control data for stopping the display, or may embed the control data into the video data. Alternatively, the user may operate the connection device 10 to stop the display.

Furthermore, in the host device display mode, the control unit 310 may return to step S21 without terminating the process after step S23. Moreover, when the user performs an operation instructing a switching to the HMD display mode during the executing and in the execution of step S23, the control unit 310 may transition to step S24 to start the HMD display mode.

When executing the HMD display mode, the control unit 310 starts a process of setting data about a sensor output value acquired from the connection device 10 via the cable 2, as the operation data to the PC 300 (step S24).

The control unit 310 acquires the image data captured by the camera 61 and the output value of each sensor from the connection device 10 via the USB cable 2B (step S25). In step S25, the control unit 310 acquires at least the captured image data and the output value of the distance sensor 64. Step S25 is executed by the detected value acquisition unit 312, for example.

The control unit 310 determines whether or not the display unit 330 is included in the image data captured by the camera 61 (step S26). In step S26, the control unit 310 detects the image of the display unit 330 from the captured image data by pattern matching, for example.

When determining that the display unit 330 is not included in the captured image data (step S26: NO), the control unit 310 transitions to step S37 described later.

When determining that the display unit 330 is included in the captured image data (step S26: YES), the control unit 310 detects a position and a posture of the display unit 330, based on the sensor output value acquired in step S25 (step S27). In step S27, the control unit 310 evaluates a relative position between the image display unit 20 and the display unit 330 based on the execution of Simultaneous Localization and Mapping (SLAM) and the detected value of the distance sensor 64, for example. Furthermore, the control unit 310 may detect the reference point P1 of the display unit 330 by the captured image data and may evaluate, from the position of the detected reference point P1, the relative position of the display unit 330 with respect to the image display unit 20.

The control unit 310 maps the position and the posture of the display unit 330 in a three-dimensional space, according to the position and the posture evaluated in step S27 (step S28). The position and the posture of the display unit 330 are represented on three-dimensional coordinates with the reference position P2 being the origin or the reference point.

The control unit 310 arranges the display image 201 in the three-dimensional space in accordance with the position and the direction of the display unit 330 (step S29). The control unit 310 arranges the display image 201 parallel to the display unit 330 and to form a surface overlapping with the display unit 330. In other words, seen from the user mounting the image display unit 20, the display image 201 becomes a plane overlapping with the display unit 330. The control unit 310 evaluates the three-dimensional coordinate with the reference position P2 being the origin or the reference point for a reference position to which the position of the display image 201 can be specified, such as positions of the four corners and the center position of the image display unit 20. The display image 201 placed in this case is an image obtained from mirroring the image displayed in the display unit 330 and is, for example, an image configuring a user interface of an operating system.

The control unit 310 specifies the position of the display unit 330 in a range where the image display unit 20 displays the image (step S30). The range where the image display unit 20 displays the image is, for example, the display region VA illustrated in FIG. 9. Furthermore, the range may also refer to the half mirrors 261 and 281 in the HMD 100, however, more specifically, the range designates a region where the OLED panel 223 of the OLED unit 221 and the OLED panel 243 of the OLED unit 241 form an image.

The control unit 310 configures a convergence angle and a display size of the display image 201 (step S31). In step S31, the control unit 310 configures the convergence angle of the image so that the display image 201 is visually recognized as a plane overlapping with the display unit 330. The PC 300 outputs video data including image data of an image displayed by the right display unit 22 of the image display unit 20 and image data of an image displayed by the left display unit 24. The control unit 310 adjusts a position of the display image 201 in the image for the right display unit 22 and a position of the display image 201 in the image for the left display unit 24 to adjust a convergence angle between the user's left eye LE and right eye RE.

The control unit 310 performs a process of turning off the display of the display panel 331 or alternatively, changing the display brightness (step S32) to start output of video data to the connection device 10 (step S33). When the display brightness is changed in step S32, the display brightness of the display panel 331 is set to a brightness lower than in the host device display mode.

Here, the connection device 10 starts a process of decoding the video data input into the I/F unit 110, by the display control unit 122, and displaying the decoded data by the right display unit 22 and the left display unit 24.

Steps S26 to S33 are executed by the image adjustment unit 315, for example.

After the display is started, the control unit 310 determines whether or not the visual field VR has moved (step S34). Here, the movement of the visual field VR refers to a movement of the relative position of the visual field VR with respect to the display unit 330 and corresponds to a movement of the image display unit 20 with respect to the PC 300. In step S34, the image adjustment unit 315 performs the determination based on a detected value of the position detection unit 313. Furthermore, the image adjustment unit 315 executes the following steps S35 to S40.

When determining that the visual field VR has not moved (step S34: NO), the control unit 310 determines whether or not to terminate the display (step S35). For example, when a termination of the display is instructed by an operation or the like on the display unit 330 (step S35: YES), the control unit 310 stops the output of video data to the connection device 10 and terminates the present process. On the other hand, when continuing the display (step S35: NO), the control unit 310 returns to step S33.

When determining that the visual field VR has moved (step S34: YES), the control unit 310 determines whether or not the position of the PC 300, more specifically, the position of the display unit 330, is outside of the range where the image display unit 20 displays the image (step S36). In step S36, the control unit 310 performs the determination based on the relative position and direction between the image display unit 20 and the display unit 330.

When determining that the position of the display unit 330 is outside of the display range of the image display unit 20 (step S36: YES), the control unit 310 sets the convergence angle and the size of the display image 201 to a default value (step S37). For example, the display image 201 is set to a display size larger than the size set in step S31 in order to give priority to visibility and thus the convergence angle is set to a predetermined position where the image is easily visually recognizable by the user. It is preferable that the convergence angle set as a default is set to an angle at which a burden and exhaustion when the user views the display image of the image display unit 20 is small, for example, the convergence angle allows the user to recognize the display image of the image display unit 20 as an image located 20 m ahead.

The control unit 310 sets the display brightness of the display panel 331 to a default value (step S38). The default value of the display brightness is a display brightness in the host device display mode, for example. Afterwards, the control unit 310 returns to step S33.

Furthermore, when the control unit 310 determines that the position of the display unit 330 is not outside of the display range of the image display unit 20 (step S36: NO), the display unit 330 is within the display range of the image display unit 20. In this case, the control unit 310 determines whether or not the display unit 330 has moved from outside of the display range of the image display unit 20 to within the range (step S39).

When the display unit 330 has entered the display range from outside of the display range of the image display unit 20, by the movement of the visual field VR (step S39: YES), the control unit 310 initializes a state of the video data to be output to the connection device 10 (step S40). In the initialization, the control unit 310 returns the convergence angle, the size, and the like in the video data output to the connection device 10, to the initial state. The control unit 310 returns to step S27 and executes again a process for starting the output of video data.

A specific example of the initialization process in step S40 is as follows. A first example includes a process utilizing a display image arranged and processed in step S29 executed beforehand when determining that the entire display unit 330 is within the visual field VR in step S39. Furthermore, a second process includes a process of executing the processes in and after step S25 in accordance with the position of the display unit 330 and newly resetting the position of the display image (including the depth). In addition to these processes, the control unit 310 may perform any process.

Furthermore, when the display unit 330 has not moved from outside of the display range of the image display unit 20 to within the range (step S39: NO), that is, when the state where the display unit 330 is without the display range of the image display unit 20 continues, the control unit 310 returns to step S33.

In the processes illustrated in FIGS. 7 and 11, the display system 1 may, instead of the distance sensor 64, employ the image data captured by the camera 61 to detect the distance. For example, the display system 1 stores in advance, as data for reference, the data associating a distance from the image display unit 20 to an object and a size of an image of the object in the image data captured by the camera 61, in the non-volatile storage unit 130 or the non-volatile storage unit 320. In this case, the control unit 310 can calculate a distance from the image display unit 20 to the PC 300 or the display unit 330, based on the size of the image of the PC 300 or the display unit 330 in the image data captured by the camera 61 and the data for reference.

As described above, the display system 1 of the first exemplary embodiment includes the PC 300 including the display unit 330 and the HMD 100 including the image display unit 20. The HMD 100 is configured so that the external scenery is visually recognizable and includes the image display unit 20 configured to display an image overlapping with the external scenery and the display control unit 122 configured to cause the image display unit 20 to display an image, based on data input from the PC 300. The display system 1 detects a position of the display unit 330 of the PC 300 with respect to the HMD 100 and adjusts the display in the image display unit 20 when the position of the display unit 330 with respect to the HMD 100 is included in a range of the external scenery visually recognized by the image display unit 20.

Thus, the display in the image display unit 20 is adjusted to correspond to the positional relationship between the PC 300 and the HMD 100, and thus, the display state of the HMD 100 can be controlled in accordance with the position of the PC 300 being an external device.

Furthermore, the image display unit 20 in the display system 1 is a transmission-type display unit configured so that the external scenery is visually recognizable by transmitting external light. When the position of the display unit 330 with respect to the HMD 100 is included in the range of the external scenery visually recognized by the image display unit 20, the display system 1 adjusts at least one of a display position, a display size, and a shape of the image in the display region of the image display unit 20, in accordance with the display unit 330 visually recognized through the image display unit 20. Therefore, the visibility can be adjusted appropriately when the display unit 330 is visually recognized through the image display unit 20.

Furthermore, the image display unit 20 is mounted on the user's head and includes the left display unit 24 configured to emit image light directed at the user's left eye and the right display unit 22 configured to emit image light directed at the user's right eye. When the position of the display unit 330 with respect to the HMD 100 is included in the range of the external scenery visually recognized by the image display unit 20, the PC 300 in the display system 1 adjusts the convergence angle of the image displayed on the image display unit 20 corresponding to the position of the display unit 330. Thus, a distance at which the user visually recognizes the display image of the image display unit 20 can be adjusted corresponding to the position of the display unit 330.

Furthermore, when the position of the display unit 330 with respect to the HMD 100 is not included in the external scenery visually recognized through the image display unit 20, the display system 1 sets the convergence angle of the image displayed in the image display unit 20 to a predetermined initial state. Thus, the display state of the image display unit 20 can be switched appropriately between when the display unit 330 can be visually recognized and when the display unit 330 cannot be visually recognized through the image display unit 20.

Furthermore, the display system 1 adjusts the convergence angle of the image displayed in the image display unit 20 by controlling the display position of the left display unit 24 and the right display unit 22. Thus, the distance at which the user visually recognizes the display image of the image display unit 20 can easily be adjusted by controlling the display position.

The PC 300 includes the control unit 310 and when the display unit 330 is included in the external scenery visually recognized through the image display unit 20 in the HMD 100, the control unit 310 sets the display of the display unit 330, for example, to a first display state illustrated in FIG. 9. Furthermore, when the display unit 330 is not included in the external scenery visually recognized through the image display unit 20 in the HMD 100, the control unit 310 sets the display of the display unit 330, for example, to a second display state illustrated in FIG. 10. In the second display state, the control unit 310 executes either one of control for hiding the display in the display unit 330 or control for lowering the brightness of the display unit 330 than the brightness in the first display state. Thus, by the control of the control unit 310, the display state of the display unit 330 of the PC 300 is controlled corresponding to the positional relationship between the PC 300 and the HMD 100. Therefore, the display states of the display unit 330 of the PC 300 can be adjusted appropriately corresponding to the positional relationship between the PC 300 and the HMD 100.

The display system 1 can be executed by switching between the HMD display mode (external operation mode) where the operation of the PC 300 is controlled based on an operation on the HMD 100, and the host device display mode (normal operation mode) where control of the operation of the PC 300 is not performed based on the operation on the HMD 100. In the HMD display mode, the PC 300 executes display control of the image display unit 20 based on the position of the display unit 330 with respect to the HMD 100. Furthermore, in the host device display mode, the PC 300 executes either one of control for hiding the display in the display unit 330 or control for lowering the brightness of the display unit 330 than the brightness in the external operation mode. Thus, display control of the image display unit 20 in accordance with the position of the PC 300 can be performed corresponding to each of a case where the control of the operation of the PC 300 is not performed based on the operation on the HMD 100 and a case where the operation of the PC 300 is controlled based on the operation on the HMD 100.

The PC 300 includes the position detection unit 313 configured to evaluate the position of the display unit 330 with respect to the HMD 100 and the image adjustment unit 315 configured to process data to be output to the HMD 100. The image adjustment unit 315 performs adjustment when the position of the display unit 330 detected by the position detection unit 313 is included in the range of the external scenery visually recognized by the image display unit 20. In the adjustment, at least one of a display position, a display size, and a shape of the image in the display region of the image display unit 20 is adjusted in accordance with the display unit 330 visually recognized through the image display unit 20. Thus, the display state of the HMD 100 can be controlled in accordance with the position of the PC 300 by a function of the PC 300.

In the configuration of the exemplary embodiment described above, the control unit 310 controls the convergence angle by adjusting the image display position of the image for the right eye RE and the image for the left eye LE to control the visually recognized distance at which the user perceives the display image 201 of the image display unit 20.

When the visually recognized distance at which the user perceives the display image of the image display unit 20 can be adjusted by an optical system in included the right display unit 22 and the left display unit 24, the image display unit 20 may perform adjustment by controlling the optical system, instead of controlling the convergence angle. The exemplary embodiment may have a configuration, for example, in which a focal position of a virtual image is adjusted in the left display unit 24 and the right display unit 22. That is, the optical system may be controlled so that the user perceives the display image 201 as an image at the same position as the display unit 330. In this case, the distance at which the user visually recognizes the display image of the image display unit 20 can be adjusted by adjusting the focal position of the virtual image. Thus, the distance at which the display image 201 is visually recognized can be associated with the position of the display unit 330 of the PC 300 and a display by the HMD 100 and the display of the PC 300 can be coordinated more appropriately.

An example of the optical system mentioned above includes a configuration including a lens moveable in a left-right direction connecting the right eye RE and the left eye LE. In this configuration, a lens moveable in the left-right direction is placed in each of the right display unit 22 and the left display unit 24. For example, the lens may be placed between the right optical system 251 and the half mirror 261 and between the left optical system 252 and the half mirror 281. Furthermore, the lens may be placed inside the right optical system 251 and the left optical system 252. The convergence angle can be changed by moving a position of the image light entering each of the right eye RE and the left eye LE in the left-right direction in corresponding with the position of the lens. In this example, a configuration is applied in which the control unit 120 controls the movement of the lens. The convergence angle calculated by the control unit 310 can be realized by outputting video data and control data specifying the lens position to the connection device 10 by the control unit 310.

Furthermore, a holographic display device may be provided for the optical system configured to output the image light by the image display unit 20. In this case, the image display unit 20 includes, for example, a light source and a Spatial Light Modulator (SLM) configured to modulate light from the light source. For example, a Liquid Crystal On Silicon (LCOS)-SLM using a liquid crystal can be employed for the SLM. In this configuration, upon outputting display data to the SLM by the connection device 10, reference light emitted from the light source is modulated by the SLM to image a stereoscopic image. In this case, a focal distance of the stereoscopic image imaged by the image display unit 20 can be adjusted by adjusting video data output from the PC 300 to the connection device 10 or display data generated by the display control unit 122 from the video data output by the PC 300. Thus, in the present exemplary embodiment, the distance at which the user visually recognizes the image displayed by the image display unit 20 can be adjusted by controlling the focal distance of the stereoscopic image in the image display unit 20 configured as a holographic display device, instead of controlling the adjustment of the convergence angle.

2. Second Exemplary Embodiment

Figure 12:
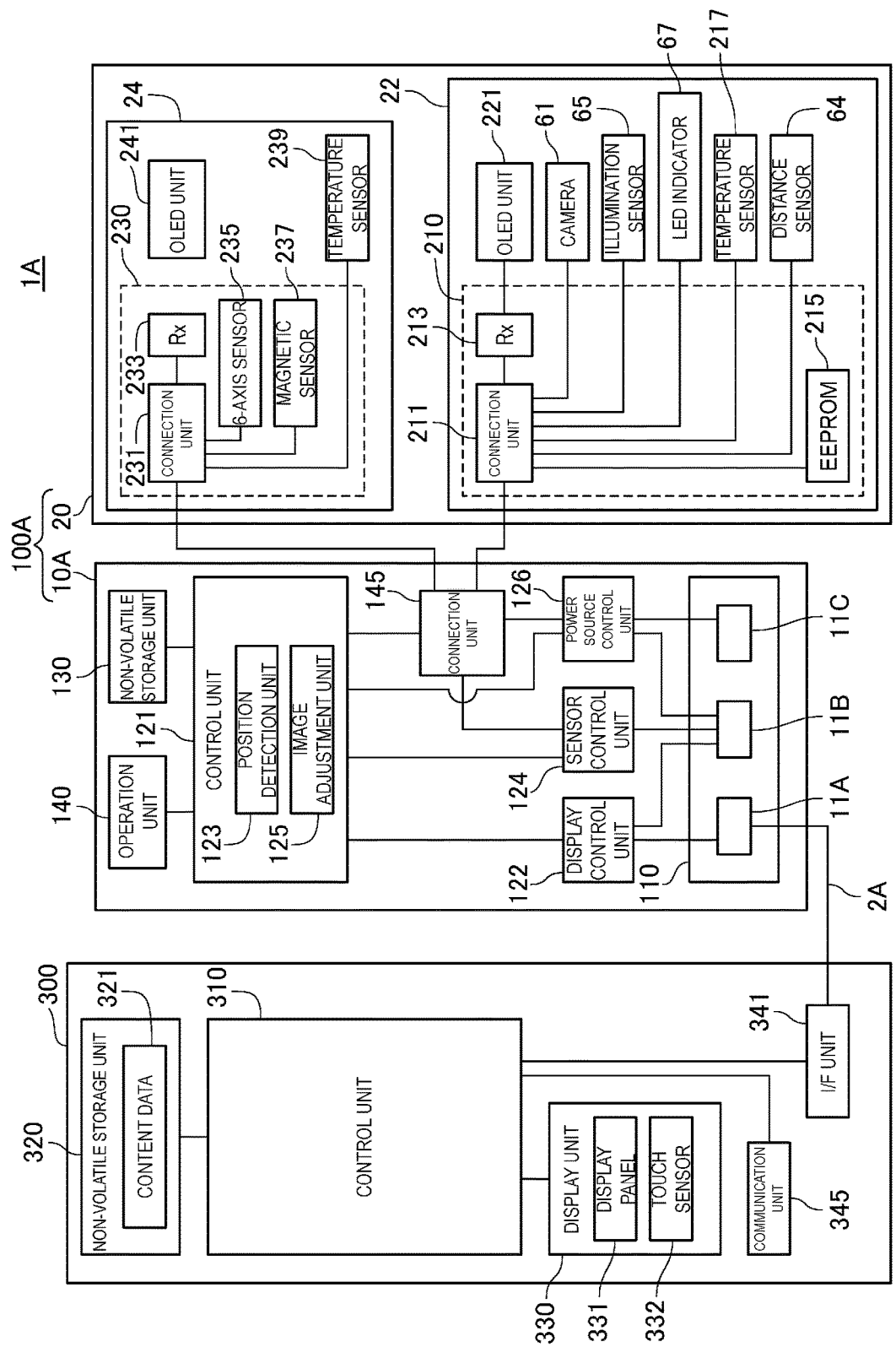
FIG. 12 is a block diagram of each component constituting a display system in a second exemplary embodiment.

FIG. 12 is a block diagram of each component constituting a display system 1A according to a second exemplary embodiment.

The display system 1A has a configuration in which the HMD 100 includes a control device 10A instead of the connection device 10 in the display system 1 described in the first exemplary embodiment. The control device 10A includes a control unit 121 and the control unit 121 processes video data input from the PC 300. The display system 1A includes similar constituent elements to constituent elements in the display system 1 excluding the control unit 121 and the configuration of each component associated thereto. The same constituent elements as those in the display system 1 are indicated with the same reference signs and description thereof is omitted.

Similarly to the control unit 120 (FIG. 5), the control unit 121 includes a processor (not illustrated) such as a CPU or a microcomputer and controls each component of the HMD 100 by a cooperation between software and hardware by executing a program by the processor. Furthermore, the control unit 121 may be constituted of programmed hardware.

The non-volatile storage unit 130, the operation unit 140, and the connection unit 145 are connected to the control unit 121. Furthermore, the control unit 121 includes a position detection unit 123 and an image adjustment unit 125. The position detection unit 123 detects the position of the HMD 100, similarly to the position detection unit 313. More specifically, the position detection unit 123 detects the relative position between the PC 300 and the image display unit 20, based on an output value of a sensor included in the image display unit 20. Furthermore, the control unit 121 can also execute, for example, a process in which the control unit 310 evaluates a distance to an object from image data captured by the camera 61, as described in the first exemplary embodiment.

The relative position to be detected by the position detection unit 123 may be a position in a space where the image display unit 20 and the PC 300 exist. Furthermore, the relative position may include the relative orientation between the display unit 330 and the image display unit 20. For example, the relative position may be information indicating a position and/or a direction of the display unit 330 with the image display unit 20 as reference. Furthermore, the relative position may be, for example, information indicating a position and/or a direction of the image display unit 20 with the PC 300 as reference. Moreover, the relative position may include a coordinate in a three-dimensional coordinate system set in a space where the image display unit 20 and the PC 300 exist.

The image adjustment unit 125 performs image process on video data input to the I/F unit 110. The image process to be performed by the image adjustment unit 125 is similar to the process by the image adjustment unit 315 described in the first exemplary embodiment and the second exemplary embodiment.

For example, the image adjustment unit 125 performs resolution conversion (scaling), frame rate conversion, color tone compensation, data format change, and the like, of video data input to the I/F unit 110, in accordance with a specification of the HMD 100.

Furthermore, the control unit 121 determines whether the PC 300 is in the host device display mode or in the HMD display mode. In the HMD display mode, the control unit 121 outputs data related to an output value of a sensor, to the PC 300.

The display system 1A executes, similarly to the display system 1, the calibration process illustrated in FIG. 7. When the display system 1A executes the operation in FIG. 7, the position detection unit 123 executes steps S13 to S15.

Furthermore, the control unit 121 executes an operation similar to the operation of the control unit 310 illustrated in FIG. 11.

In the second exemplary embodiment, the image adjustment unit 125 displays an image by the image display unit 20, based on video data input from the PC 300. Furthermore, in the HMD display mode, the image adjustment unit 125 controls the display of the image display unit 20 corresponding to a case where the display unit 330 is included in the visual field VR and a case where the display unit 330 is not included in the visual field VR.

Figure 13:
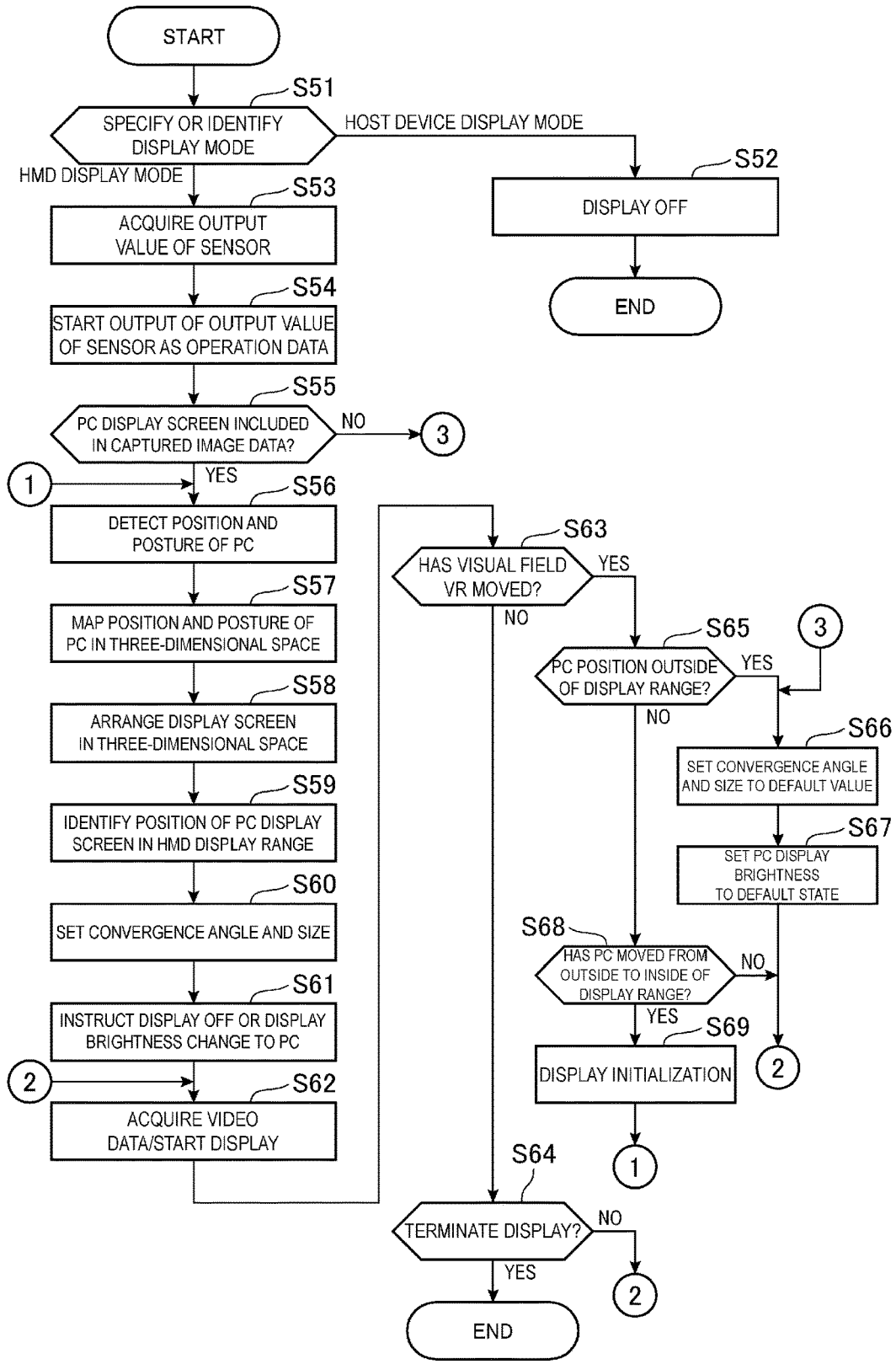
FIG. 13 is a flowchart illustrating an operation of the display system in the second exemplary embodiment.

FIG. 13 is a flowchart illustrating an operation of the display system 1A in the second exemplary embodiment and illustrates an operation of the control unit 121.

In the present exemplary embodiment, the HMD 100 displays an image based on the video data output by the PC 300 via the HDMI cable 2A and the HMD 100 performs display control based on the relative position between the image display unit 20 and the PC 300.

For example, the operation in FIG. 13 is started on condition of detecting that the PC 300 is connected to the connection device 10 via the cable 2.

First, an instruction or identification whether to execute the HMD display mode or to execute the host device display mode as the display mode is performed in the PC 300 and the control unit 121 acquires an identification result (step S51).

When the PC 300 executes the host device display mode, the control unit 121 turns off the display by the image display unit 20 (step S52) and terminates this process.

Note that, in the host device display mode, when the PC 300 outputs video data for an image or a video other than the display image of the display unit 330, the control unit 121 may display an image based on the video data by the image display unit 20.

When the PC 300 executes the HMD display mode, the control unit 121 acquires image data captured by the camera 61 and an output value of each sensor of the connection device 10, and acquires an output value of a sensor included in the image display unit 20 (step S53). The control unit 121 starts a process of outputting data related to the output value of the sensor to the PC 300 (step S54).

The control unit 121 determines whether or not the display unit 330 is included in the image data captured by the camera 61 (step S55). When determining that the display unit 330 is not included in the captured image data (step S55: NO), the control unit 121 transitions to step S66 described later.

When determining that the display unit 330 is included in the captured image data (step S55: YES), the control unit 121 detects a position and a posture of the display unit 330, based on the sensor output value acquired in step S53 (step S56). The control unit 121 maps the position and the posture of the display unit 330 in a three-dimensional space, according to the position and the posture evaluated in step S56 (step S57). The position and the posture of the display unit 330 are represented on three-dimensional coordinates with the reference position P2 being the origin or the reference point. The control unit 121 arranges the display image 201 in the three-dimensional space in accordance with the position and the direction of the display unit 330 (step S58).

The control unit 121 specifies the position of the display unit 330 in a range where the image display unit 20 displays the image (step S59). The control unit 121 sets a convergence angle and a display size of the display image 201 (step S60). In step S61, the control unit 121 sets the convergence angle of the image so that the display image 201 is visually recognized as a plane overlapping with the display unit 330.

The processes of steps S55 to S60 are similar to the processes of steps S26 to S31 by the PC 300 described in FIG. 11.

The control unit 121 instructs the PC 300 to turn off the display of the display panel 331 or to change the display brightness (step S61). The instruction is transmitted as control data via the USB cable 2B, for example. When the display brightness is changed in step S62, the display brightness of the display panel 331 is set to a brightness lower than the brightness in the host device display mode.

The control unit 121 acquires video data output by the PC 300 to start display (step S62). Steps S55 to S62 are executed by the image adjustment unit 125, for example.

After the display is started, the control unit 121 determines whether or not the visual field VR has moved (step S63). In step S63, the image adjustment unit 125 performs the determination based on a detected value of the position detection unit 123. Furthermore, the image adjustment unit 125 executes the following steps S64 to S69. Moreover, the processes of steps S63 to S66, S68, and S69 are similar to the processes of steps S34 to S37, S39, and S40 by the PC 300 described in FIG. 11.

When determining that the visual field VR has not moved (step S63: NO), the control unit 121 determines whether or not to terminate the display (step S64). For example, when the HMD 100 or the PC 300 are instructed to terminate the display (step S64: YES), the control unit 121 stops the display to terminate this process. On the other hand, when continuing the display (step S64: NO), the control unit 121 returns to step S62.

When determining that the visual field VR has moved (step S63: YES), the control unit 121 determines whether or not the position of the display unit 330 of the PC 300 is outside of the range where the image display unit 20 displays the image (step S65). When determining that the position of the display unit 330 is outside of the display range of the image display unit 20 (step S65: YES), the control unit 121 sets the convergence angle and the size of the display image 201 to a default value (step S66).

The control unit 121 instructs the PC 300 to set the display brightness of the display panel 331 to a default value (step S67). The default value of the display brightness is a display brightness in the host device display mode, for example. Afterwards, the control unit 121 returns to step S62.

Furthermore, when the control unit 121 determines that the position of the display unit 330 is not outside of the display range of the image display unit 20 (step S65: NO), the display unit 330 is within the display range of the image display unit 20. In this case, the control unit 121 determines whether or not the display unit 330 has moved from outside of the display range of the image display unit 20 to within the range (step S68).

When the display unit 330 has entered the display range from outside of the display range of the image display unit 20, by the movement of the visual field VR (step S68: YES), the control unit 121 initializes the display state, based on the video data (step S69). In the initialization, the control unit 121 returns the convergence angle, the size, and the like of the display image 201 to an initial state. The control unit 121 returns to step S56 and executes again a process for starting the display.

Furthermore, when the display unit 330 has not moved from outside of the display range of the image display unit 20 to within the range (step S68: NO), that is, when the state where the display unit 330 is without the display range of the image display unit 20 continues, the control unit 121 returns to step S62.

Thus, in the display system 1A, an HMD 100A (display device) includes the position detection unit 123 configured to detect the position of the display unit 330 for the PC 300 having the display unit 330. Furthermore, the HMD 100A includes the image adjustment unit 125 (image processing unit) configured to cause the image display unit 20 to display an image. The image adjustment unit 125 adjusts the display in the image display unit 20, when the position of the display unit 330 detected by the position detection unit 123 is included in the range of the external scenery visually recognized by the image display unit 20. Thus, the HMD 100 adjusts the display in the image display unit 20, corresponding to the positional relationship between the PC 300 and the HMD 100. Therefore, the display by the HMD 100 can be controlled in accordance with the position of the PC 300 being an external device.

Furthermore, in a configuration in which the PC 300 mirrors and outputs, via the HDMI cable 2A, the same image as the image displayed by the display unit 330, the HMD 100A adjusts the display image of the image display unit 20. That is, the HMD 100A changes a display form of the image displayed by the image display unit 20, corresponding to the direction of the image display unit 20 and the relative position between the image display unit 20 and the PC 300.

Thus, the display system 1A can realize an effect of the display system 1 described in the first exemplary embodiment. Furthermore, video data can be processed in the HMD 100A and thus, when a general-purpose device configured to output video data is connected instead of the PC 300, there is an advantage that the display form can be changed corresponding to the position and the direction of the image display unit 20.

Note that the present invention is not limited to each of the exemplary embodiments configured as described above and can be implemented in various aspects, as long as the aspects fall within the spirit of the invention.

For example, in the above-described exemplary embodiment, the configuration in which the user visually recognizes the external scenery through the display unit is not limited to a configuration in which the right light-guiding plate 26 and the left light-guiding plate 28 transmit the external light. For example, the present invention can also be applied to a display device configured to display an image in a state where the external scenery cannot be visually recognized. Specifically, the present invention can be applied to a display device configured to display an image captured by the camera 61 for capturing the external scenery, an image or a CG generated based on the captured image, a video and the like based on video data stored in advance or video data input from the outside. This type of display devices can include a so-called closed-type display device that does not allow for visual recognition of the external scenery. Furthermore, an AR display displaying an image in an overlapping manner with the real space, as described in the above exemplary embodiment, and a Mixed Reality (MR) display combining a captured image of the real space with a virtual image may also be employed. Alternatively, the present invention can also be applied to a display device that does not perform a Virtual Reality (VR) display process of displaying a virtual image. For example, the present invention can obviously also be applied to a display device configured to display video data input from the outside or an analog video signal.

Furthermore, instead of the image display unit 20, for example, an image display unit having another scheme may be adopted, such as a mountable image display unit such as a cap, as long as a display unit configured to display an image corresponding to the user's left eye and a display unit configured to display an image corresponding to the user's right eye are included. Moreover, the display device of the present invention may be configured, for example, as a head-mounted display to be mounted in a vehicle such as a car or an airplane. Furthermore, the display device of the present invention may be configured, for example, as a head-mounted display built in a body protection tool such as a helmet. In this case, a portion positioning a position for the user's body and a portion being positioned to the portion can be a mounting part.

Furthermore, the HMD 100A of the second exemplary embodiment may have a configuration in which the control device 10A and the image display unit 20 are integrally formed to be mounted on the user's head. Moreover, a portable electronic device including a notebook-type computer, a tablet-type computer, a game console, a portable phone device, a smart phone, and a portable media player, as well as other dedicated devices or the like may be employed for the control device 10A. Furthermore, the exemplary embodiment described above may have a configuration in which the connection device 10 and the image display unit 20 may be connected to each other via a radio communication line.

Furthermore, a device connected to the HMD 100 or 100A in the display system 1 is not limited to the PC 300. For example, the device may be a stationary television receiver or a monitor of a stationary personal computer. Furthermore, a projector configured to project an image on a display surface may be employed instead of the PC 300 and in this case, a projection surface on which the projector projects the image corresponds to the display screen. Moreover, in addition to these devices, a portable or stationary electronic device can be employed instead of the PC 300. The PC 300 or the various types of electronic devices utilized instead of the PC 300 may be wirelessly connected to the HMD 100 or 100A. For example, wireless video communication interfaces such as Miracast (registered trademark) or WirelessHD (registered trademark) may be utilized instead of the connector 11A. Furthermore, instead of the connector 11B, wireless LAN (including WiFi (registered trademark)) may be employed and Bluetooth (registered trademark) may be utilized.

Such a configuration may be adopted that at least some of the functional blocks illustrated in the block diagram are achieved with hardware, or achieved by a cooperation between software and hardware and the configuration is not limited to the arrangement of the independent hardware resource as illustrated.

The entire disclosure of Japanese Patent Application No. 2017-246846, filed Dec. 22, 2017 is expressly incorporated by reference herein.

What is claimed is:

1. A display system comprising: an electronic device including a first display unit; and a display device including a second display unit, wherein
the display device comprises:
the second display unit configured so that an external scenery is visually recognizable,
the second display unit being configured to display an image in an overlapping manner with the external scenery, and
a display control unit configured to cause the second display unit to display an image based on data input from the electronic device, wherein
the display system configured so that a position of the first display unit of the electronic device with respect to the display device is detected,
a display in the second display unit is adjusted when the position of the first display unit with respect to the display device is included in a range of the external scenery visually recognized by the second display unit,
the electronic device comprises an electronic device control unit configured to set a display of the first display unit to a first display state, when the first display unit is included in the external scenery visually recognized through the second display unit in the display device, and set a display of the first display unit to a second display state, when the first display unit is not included in the external scenery visually recognized through the second display unit in the display device, and the electronic device control unit is configured to execute, in the second display state, either one of control for hiding the display in the first display unit or control for lowering a brightness of the first display unit than a brightness in the first display state.

2. The display system according to claim 1, wherein the second display unit is a transmission-type display unit configured so that the external scenery is visually recognizable by transmitting external light, and at least one of a display position, a display size, and a shape of an image in a display region of the second display unit is adjusted in accordance with the first display unit visually recognized through the second display unit, when the position of the first display unit with respect to the display device is included in the range of the external scenery visually recognized by the second display unit.

3. The display system according to claim 2, wherein the second display unit is mounted on a head of a user, the second display unit comprising a display unit for left-eye configured to emit image light directed at a left eye of the user and a display unit for right-eye configured to emit image light directed at a right eye of the user, and a convergence angle of an image displayed in the second display unit is adjusted to correspond to the position of the first display unit, when the first display unit is included in the external scenery visually recognized through the second display unit.

4. The display system according to claim 3, wherein the convergence angle of the image displayed in the second display unit is set to a predetermined initial state, when the position of the first display unit with respect to the display device is not included in the external scenery visually recognized through the second display unit.

5. The display system according to claim 3, wherein the convergence angle of the image displayed in the second display unit is adjusted by controlling a display position of the display unit for left-eye and the display unit for right-eye.

6. The display system according to claim 3, wherein a focal position of a virtual image in the display unit for left-eye and the display unit for right-eye is adjusted to correspond to the position of the first display unit, when the first display unit is included in the external scenery visually recognized through the second display unit.

7. A display system comprising: an electronic device including a first display unit; and a display device including a second display unit, wherein the display device comprises:

the second display unit configured so that an external scenery is visually recognizable, the second display unit being configured to display an image in an overlapping manner with the external scenery, and a display control unit configured to cause the second display unit to display an image based on data input from the electronic device, wherein the display system configured so that a position of the first display unit of the electronic device with respect to the display device is detected, a display in the second display unit is adjusted when the position of the first display unit with respect to the display device is included in a range of the external scenery visually recognized by the second display unit, the display system can be executed by switching between an external operation mode where an operation of the electronic device is controlled based on an operation on the display device, and a normal operation mode where control of the operation of the electronic device is not performed based on an operation on the display device, control of the display of the first display unit is executed based on the position of the first display unit with respect to the display device in the external operation mode, and either one of control for hiding the display in the first display unit or control for lowering a brightness of the second display unit than the brightness in the external operation mode is executed in the normal operation mode.

8. A display system comprising: an electronic device including a first display unit; and a display device including a second display unit, wherein the display device comprises:

the second display unit configured so that an external scenery is visually recognizable, the second display unit being configured to display an image in an overlapping manner with the external scenery, and a display control unit configured to cause the second display unit to display an image based on data input from the electronic device, wherein the display system configured so that a position of the first display unit of the electronic device with respect to the display device is detected, a display in the second display unit is adjusted when the position of the first display unit with respect to the display device is included in a range of the external scenery visually recognized by the second display unit, the electronic device comprises a position detection unit configured to evaluate a position of the first display unit with respect to the display device, and a video processing unit configured to process data output to the display device, and the video processing unit is configured to adjust at least one of a display position, a display size, and a shape of an image in a display region of the second display unit in accordance with the first display unit visually recognized through the second display unit, when the position of the first display unit detected by the position detection unit is included in the range of the external scenery visually recognized by the second display unit.

9. A method of controlling a display system including an electronic device and a display device, the method comprising:

displaying, in a second display unit, an image based on data input from the electronic device to the display device;

detecting a position of a first display unit of the electronic device with respect to the display device; and adjusting a display in the second display unit when the position of the first display unit with respect to the display device is included in a range of an external scenery visually recognized by the second display unit, wherein the electronic device comprises an electronic device control unit configured to set a display of the first display unit to a first display state, when the first display unit is included in the external scenery visually recognized through the second display unit in the display device, and set a display of the first display unit to a second display state, when the first display unit is not included in the external scenery visually recognized through the second display unit in the display device, and the electronic device control unit is configured to execute, in the second display state, either one of control for hiding the display in the first display unit or control for lowering a brightness of the first display unit than a brightness in the first display state.

10. A display device comprising:
a position detection unit configured to detect a position of a first display unit of an electronic device;
a second display unit configured so that an external scenery is visually recognizable and the second display unit being configured to display an image in an overlapping manner with the external scenery; and
a display control unit configured to cause the second display unit to display an image, wherein
the display control unit is configured to adjust a display in the second display unit when the position of the first display unit detected by the position detection unit is included in a range of the external scenery visually recognized by the second display unit,
the electronic device comprises an electronic device control unit configured to set a display of the first display unit to a first display state, when the first display unit is included in the external scenery visually recognized through the second display unit in the display device, and set a display of the first display unit to a second display state, when the first display unit is not included in the external scenery visually recognized through the second display unit in the display device, and
the electronic device control unit is configured to execute, in the second display state, either one of control for hiding the display in the first display unit or control for lowering a brightness of the first display unit than a brightness in the first display state.

11. A display system comprising: an electronic device including a first display unit; and a display device including a second display unit, wherein
the display device comprises:
the second display unit configured so that an external scenery is visually recognizable,
the second display unit being configured to display an image in an overlapping manner with the external scenery, and a display control unit configured to cause the second display unit to display an image based on data input from the electronic device, wherein
the display system configured so that a position of the first display unit of the electronic device with respect to the display device is detected,
a display in the second display unit is adjusted when the position of the first display unit with respect to the display device is included in a range of the external scenery visually recognized by the second display unit,
the second display unit is a transmission-type display unit configured so that the external scenery is visually recognizable by transmitting external light,
at least one of a display position, a display size, and a shape of an image in a display region of the second display unit is adjusted in accordance with the first display unit visually recognized through the second display unit, when the position of the first display unit with respect to the display device is included in the range of the external scenery visually recognized by the second display unit,
the second display unit is mounted on a head of a user, the second display unit comprising a display unit for left-eye configured to emit image light directed at a left eye of the user and a display unit for right-eye configured to emit image light directed at a right eye of the user, and
a convergence angle of an image displayed in the second display unit is adjusted to correspond to the position of the first display unit, when the first display unit is included in the external scenery visually recognized through the second display unit.

12. The display system according to claim 11, wherein the convergence angle of the image displayed in the second display unit is set to a predetermined initial state, when the position of the first display unit with respect to the display device is not included in the external scenery visually recognized through the second display unit.

13. The display system according to claim 11, wherein the convergence angle of the image displayed in the second display unit is adjusted by controlling a display position of the display unit for left-eye and the display unit for right-eye.

14. The display system according to claim 11, wherein a focal position of a virtual image in the display unit for left-eye and the display unit for right-eye is adjusted to correspond to the position of the first display unit, when the first display unit is included in the external scenery visually recognized through the second display unit.

* * * * *